United States Patent [19]

Weder

[11] Patent Number: 5,991,999
[45] Date of Patent: *Nov. 30, 1999

[54] METHOD OF COVERING FOR FLOWER POT AND FLORAL GROUPING

[75] Inventor: Donald E. Weder, Highland, Ill.

[73] Assignee: Southpac Trust International, Inc.

[ * ] Notice: This patent is subject to a terminal disclaimer.

[21] Appl. No.: 08/818,619

[22] Filed: Mar. 14, 1997

Related U.S. Application Data

[63] Continuation of application No. 08/468,112, Jun. 6, 1995, Pat. No. 5,625,936, which is a continuation of application No. 08/037,067, Mar. 25, 1993, Pat. No. 5,542,169, which is a continuation-in-part of application No. 07/926,098, Aug. 5, 1992, Pat. No. 5,809,629.

[51] Int. Cl.$^6$ .................................................. B21D 35/00
[52] U.S. Cl. .............................. 29/469.5; 29/515; 53/399; 53/464; 47/66.7; 47/72
[58] Field of Search ................................. 29/469.5, 505, 29/515; 53/397, 399, 410, 412, 464; 47/66.7, 72; 206/423

[56] References Cited

U.S. PATENT DOCUMENTS

| | | |
|---|---|---|
| 1,446,563 | 2/1923 | Hughes . |
| 1,610,652 | 12/1926 | Bouchard . |
| 1,868,853 | 7/1932 | Sievers . |
| 1,988,886 | 1/1935 | Wilson ........................................ 47/37 |
| 2,152,648 | 4/1939 | Jones .......................................... 47/34 |
| 2,209,778 | 7/1940 | Krasowski ................................... 41/10 |
| 2,302,259 | 11/1942 | Rothfuss ...................................... 41/10 |
| 2,621,142 | 12/1952 | Wetherell ................................. 154/117 |
| 2,648,487 | 8/1953 | Linda ......................................... 229/55 |
| 2,774,187 | 12/1956 | Smithers ..................................... 47/41 |

(List continued on next page.)

FOREIGN PATENT DOCUMENTS

| | | |
|---|---|---|
| 4231978 | 6/1979 | Australia . |
| 2036163 | 12/1970 | France . |
| 2619698 | 3/1989 | France . |
| 345464 | 12/1921 | Germany . |
| 513971 | 11/1930 | Germany . |
| 8905250 | 10/1989 | Germany . |
| 560532 | 4/1975 | Switzerland . |
| 1204647 | 9/1970 | United Kingdom . |
| 2074542 | 11/1981 | United Kingdom . |
| 9315979 | 8/1993 | WIPO . |

OTHER PUBLICATIONS

Ex. A — Color Them Happy With Highlander® Products, ©1992, 2 pages.
Ex. B — Super Seller, Supermarket Floral, Sep. 15, 1992.
Ex. C — Costa Keeps the Christmas Spirit, Supermarket Floral, Sep. 15, 1992.
Ex. D — Now, More Than Ever, Supermarket Floral, Sep. 15, 1992.
Ex. E — Halloween, Link Magazine, Sep. 1992, 2 pages.
Ex. F — Speed Cover® Brochure — The Simple Solution . . . , ©1989.
Ex. G — Speed Sheets and Speed Rolls Brochure, ©1990.

*Primary Examiner*—David P. Bryant
*Attorney, Agent, or Firm*—Dunlap, Codding & Rogers, P.C.

[57] ABSTRACT

A covering for a flower pot with a floral grouping disposed therein and extending a distance above an upper end of the flower pot wherein the flower pot has a lower end and an outer peripheral surface. The covering includes a sheet of material having an upper surface, a lower surface and an outer peripheral edge with a sheet extension connected to the outer peripheral edge of the sheet of material and extending a distance from the outer peripheral edge of the sheet of material. The sheet of material is formed about the flower pot to a position wherein the sheet of material extends about substantially the entire outer peripheral surface of the flower pot to provide a decorative covering and the sheet extension is formed about the floral grouping to a position wherein the sheet extension extends about a substantial portion of the floral grouping to provide a protective covering.

14 Claims, 8 Drawing Sheets

U.S. PATENT DOCUMENTS

| | | | |
|---|---|---|---|
| 2,850,842 | 9/1958 | Eubank | 47/58 |
| 3,022,605 | 2/1962 | Reynolds | 47/58 |
| 3,052,063 | 9/1962 | Dunn | 47/38 |
| 3,094,810 | 6/1963 | Kalpin | 47/37 |
| 3,134,679 | 5/1964 | Dreyfus | 53/397 |
| 3,271,922 | 9/1966 | Wallerstein et al. | 53/399 |
| 3,316,675 | 5/1967 | Cartwright | 47/37 |
| 3,431,706 | 3/1969 | Stuck | 53/390 |
| 3,488,022 | 1/1970 | Vittori | 248/152 |
| 3,557,516 | 1/1971 | Brandt | 53/14 |
| 3,962,503 | 6/1976 | Crawford | 43/397 X |
| 4,333,267 | 6/1982 | Witte | 47/84 |
| 4,384,604 | 5/1983 | DeLaura et al. | 150/52 |
| 4,413,725 | 11/1983 | Bruno et al. | 47/72 X |
| 4,621,733 | 11/1986 | Harris | 206/423 |
| 4,640,079 | 2/1987 | Stuck | 53/390 |
| 4,733,521 | 3/1988 | Weder et al. | 53/580 |
| 4,773,182 | 9/1988 | Weder et al. | 47/72 |
| 4,799,520 | 1/1989 | Blackburn et al. | 150/52 |
| 4,801,014 | 1/1989 | Meadows | 206/423 |
| 4,941,572 | 7/1990 | Harris | 206/423 |
| 4,980,209 | 12/1990 | Hill | 428/34.1 |
| 5,005,760 | 4/1991 | van den Hoogen | 229/125.38 |
| 5,105,599 | 4/1992 | Weder | 53/399 |
| 5,111,638 | 5/1992 | Weder | 53/397 |
| 5,152,100 | 10/1992 | Weder et al. | 47/72 |
| 5,181,364 | 1/1993 | Weder | 53/397 |
| 5,199,242 | 4/1993 | Weder et al. | 53/397 |
| 5,205,108 | 4/1993 | Weder et al. | 53/397 |
| 5,228,234 | 7/1993 | de Klerk et al. | 47/41.01 |
| 5,239,775 | 8/1993 | Landau | 47/72 |
| 5,259,106 | 11/1993 | Weder et al. | 29/469.5 |
| 5,353,575 | 10/1994 | Stepanek | 53/461 |
| 5,388,695 | 2/1995 | Gilbert | 206/423 |
| 5,625,936 | 5/1997 | Weder | 29/469.5 |

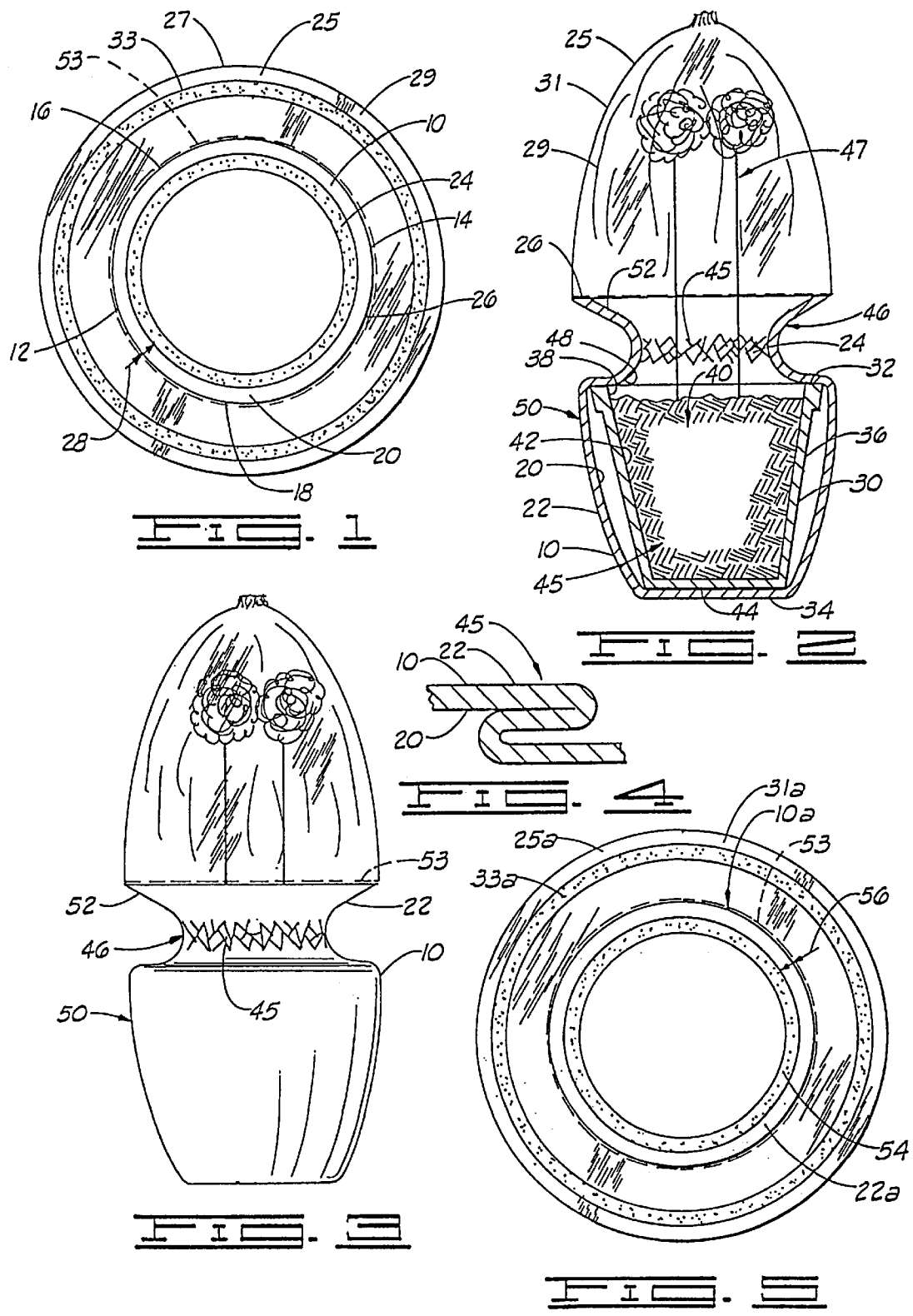

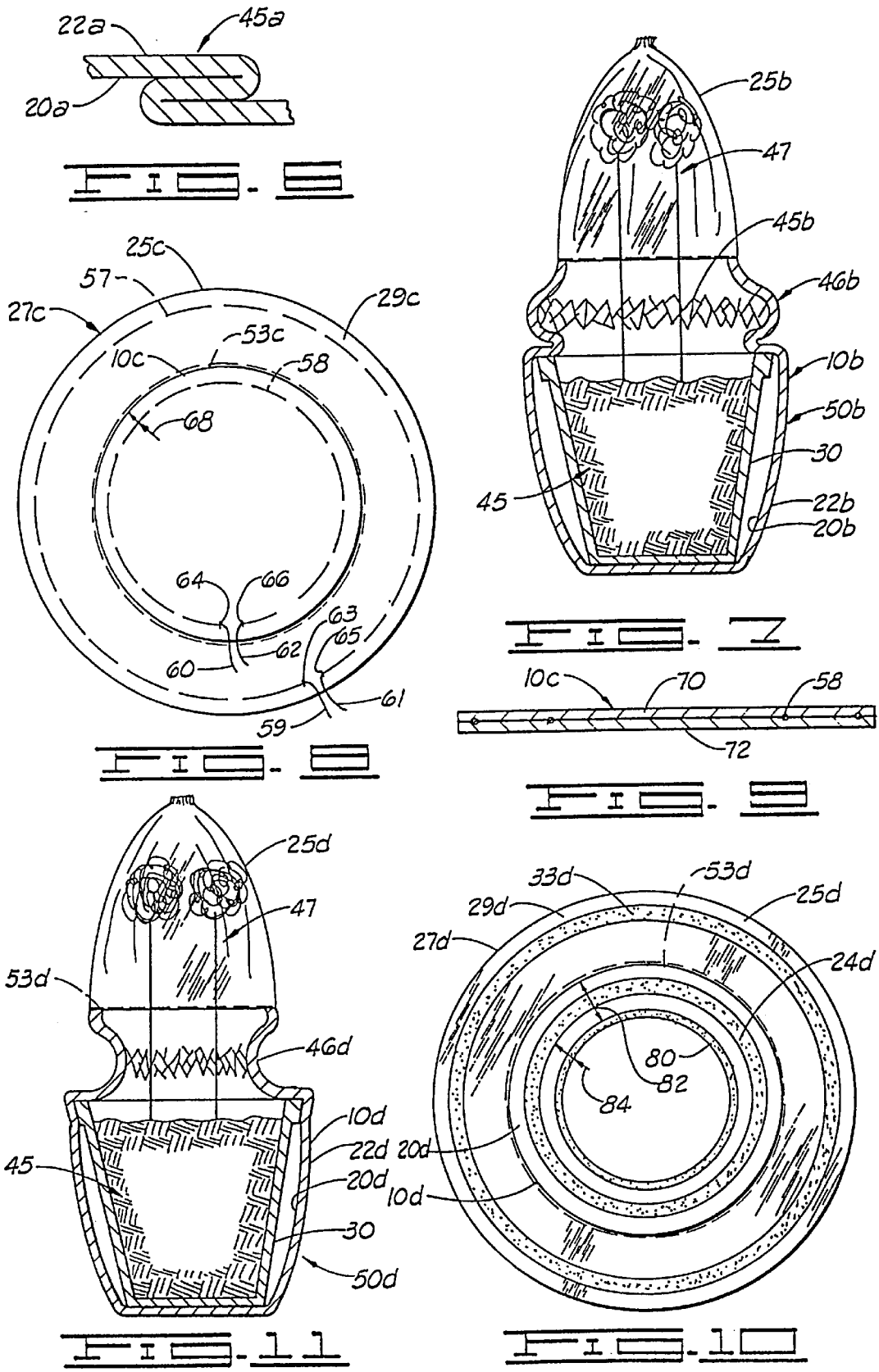

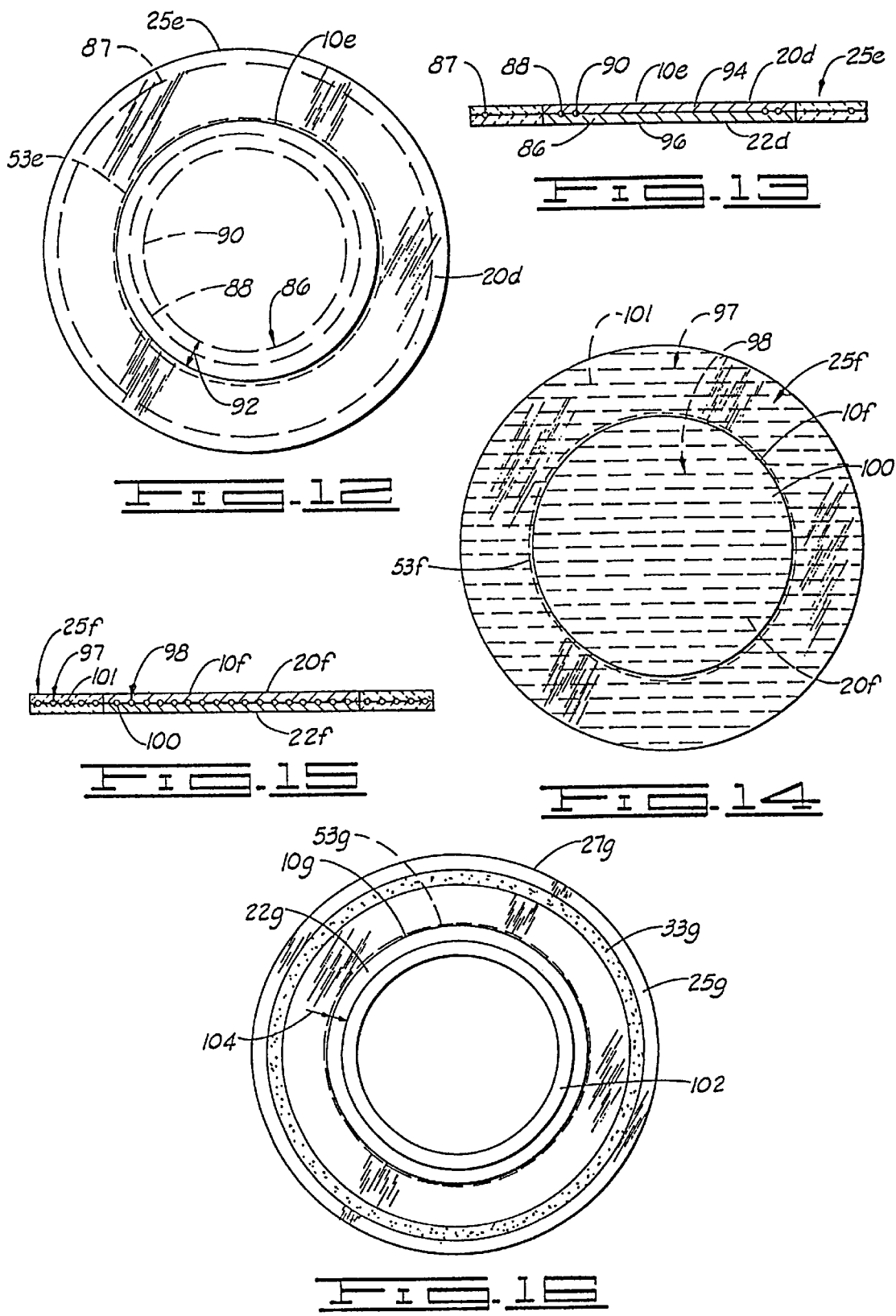

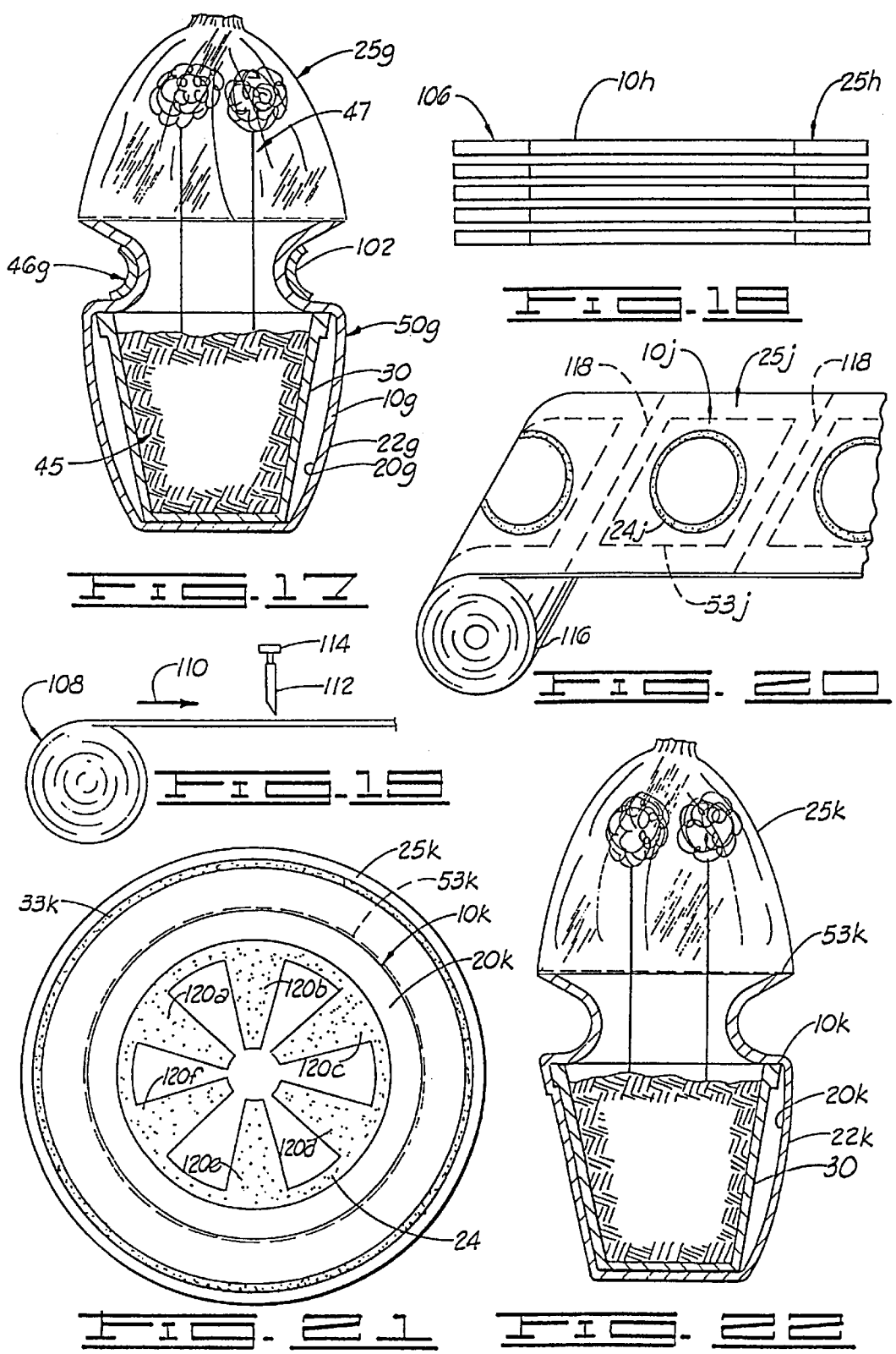

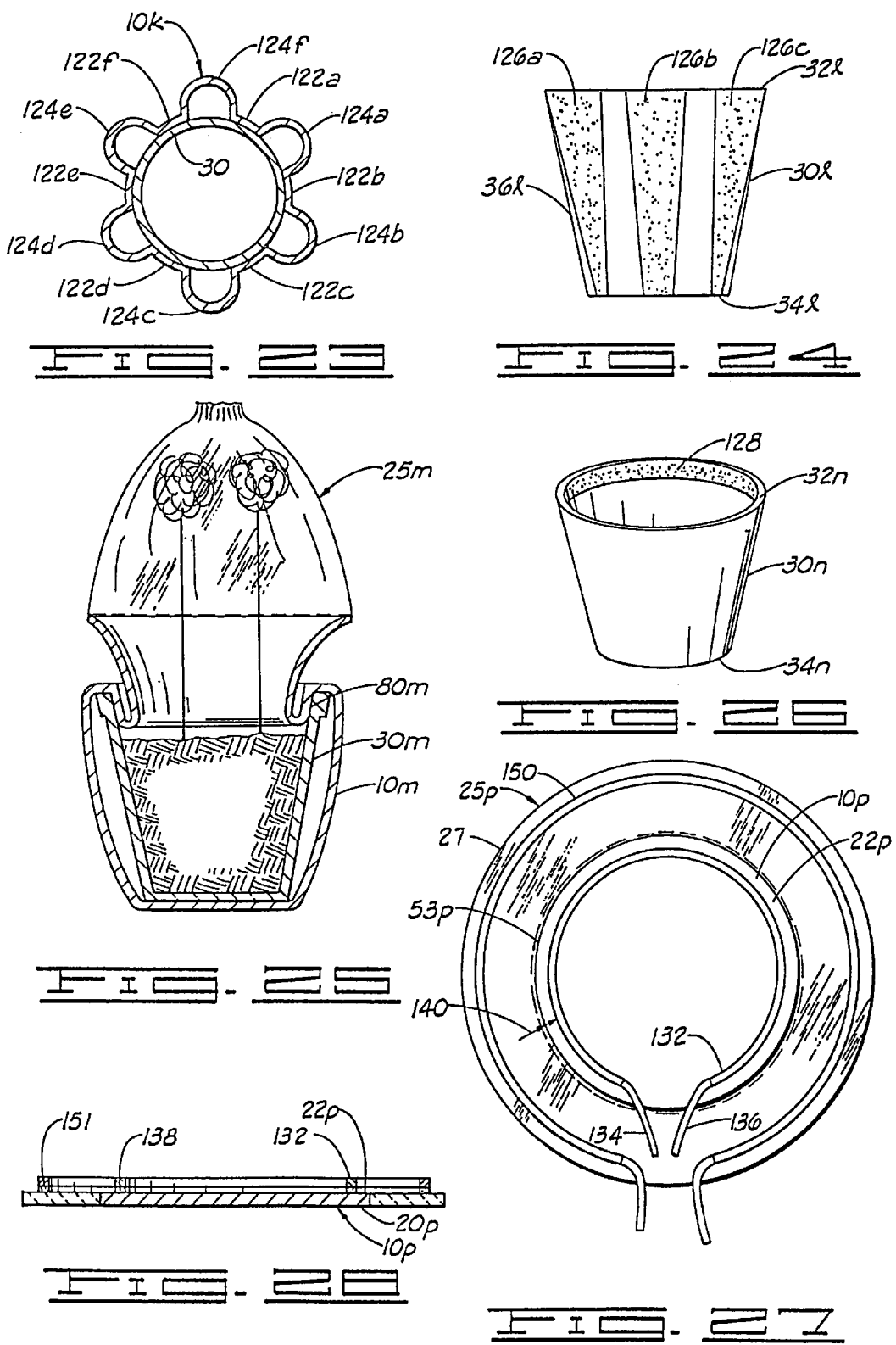

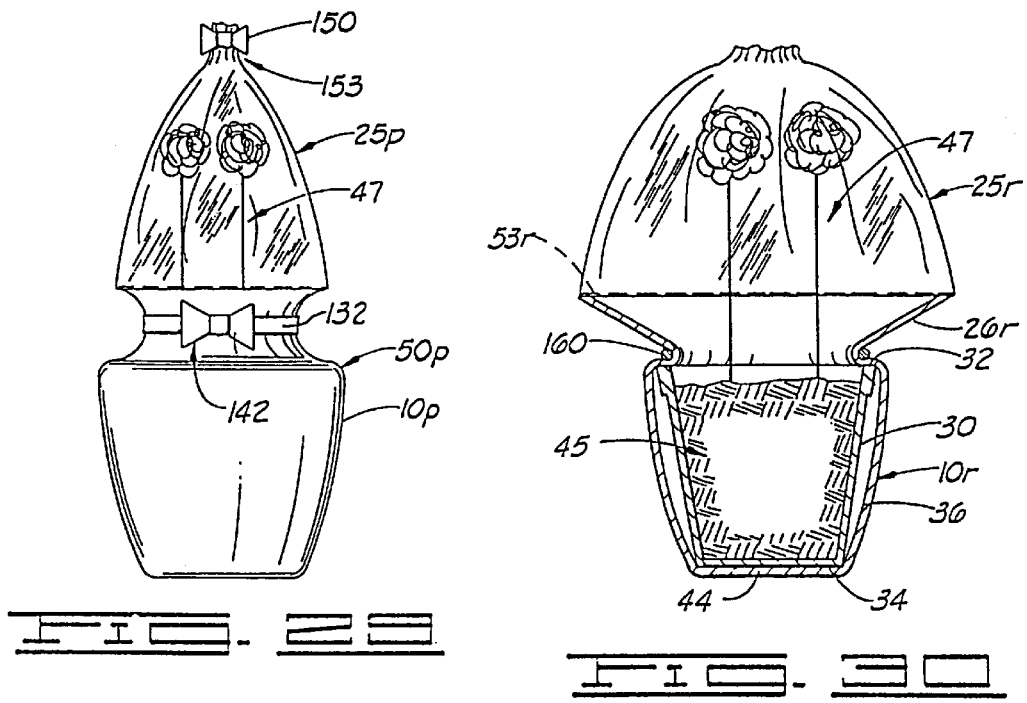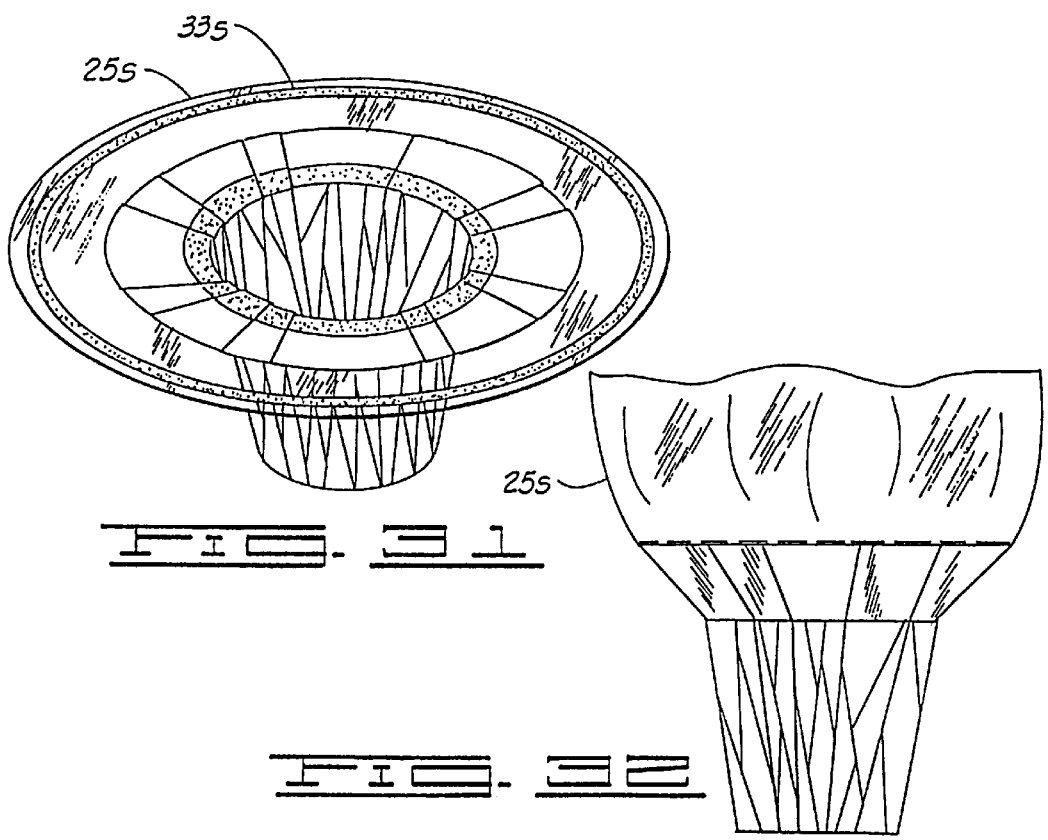

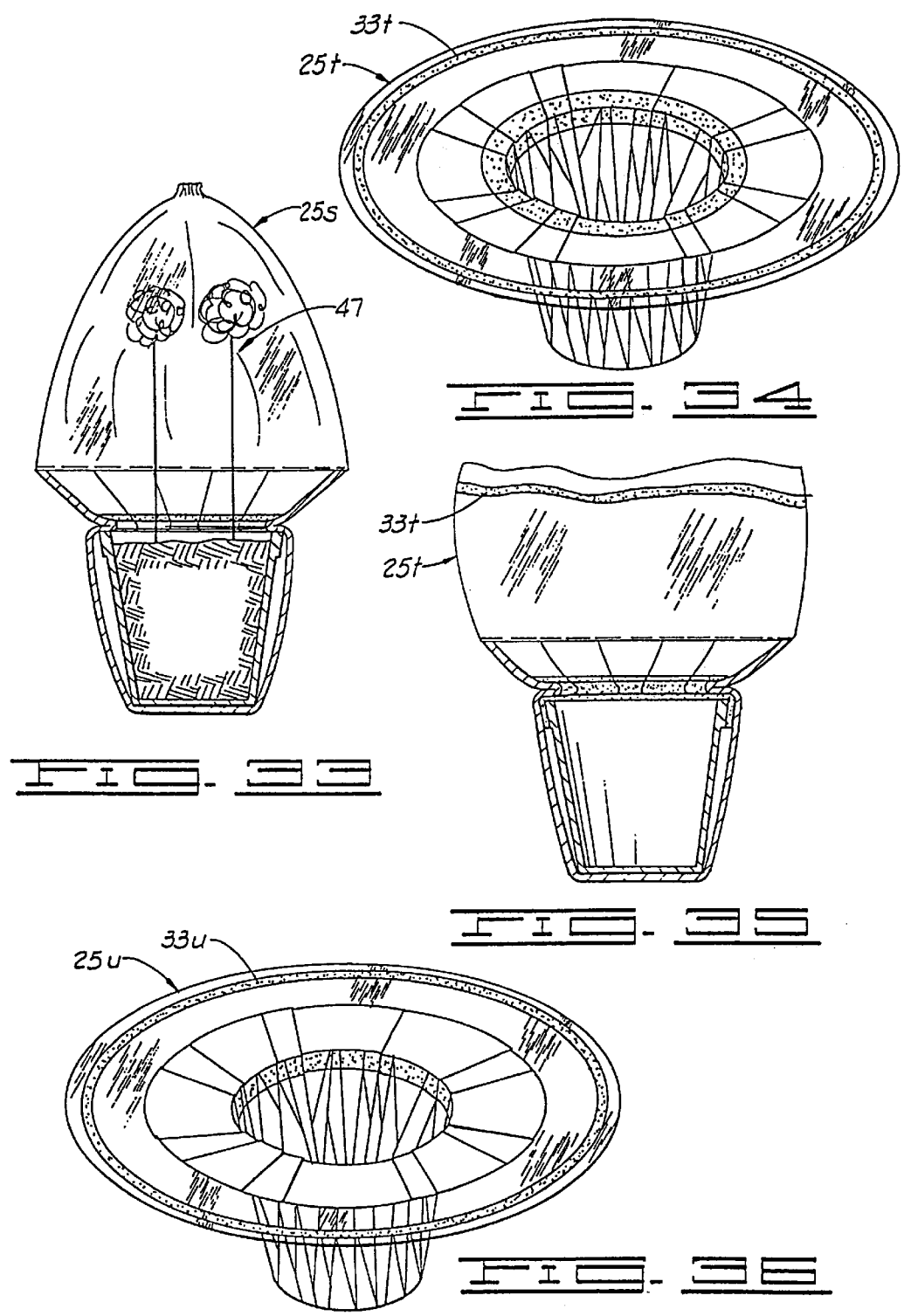

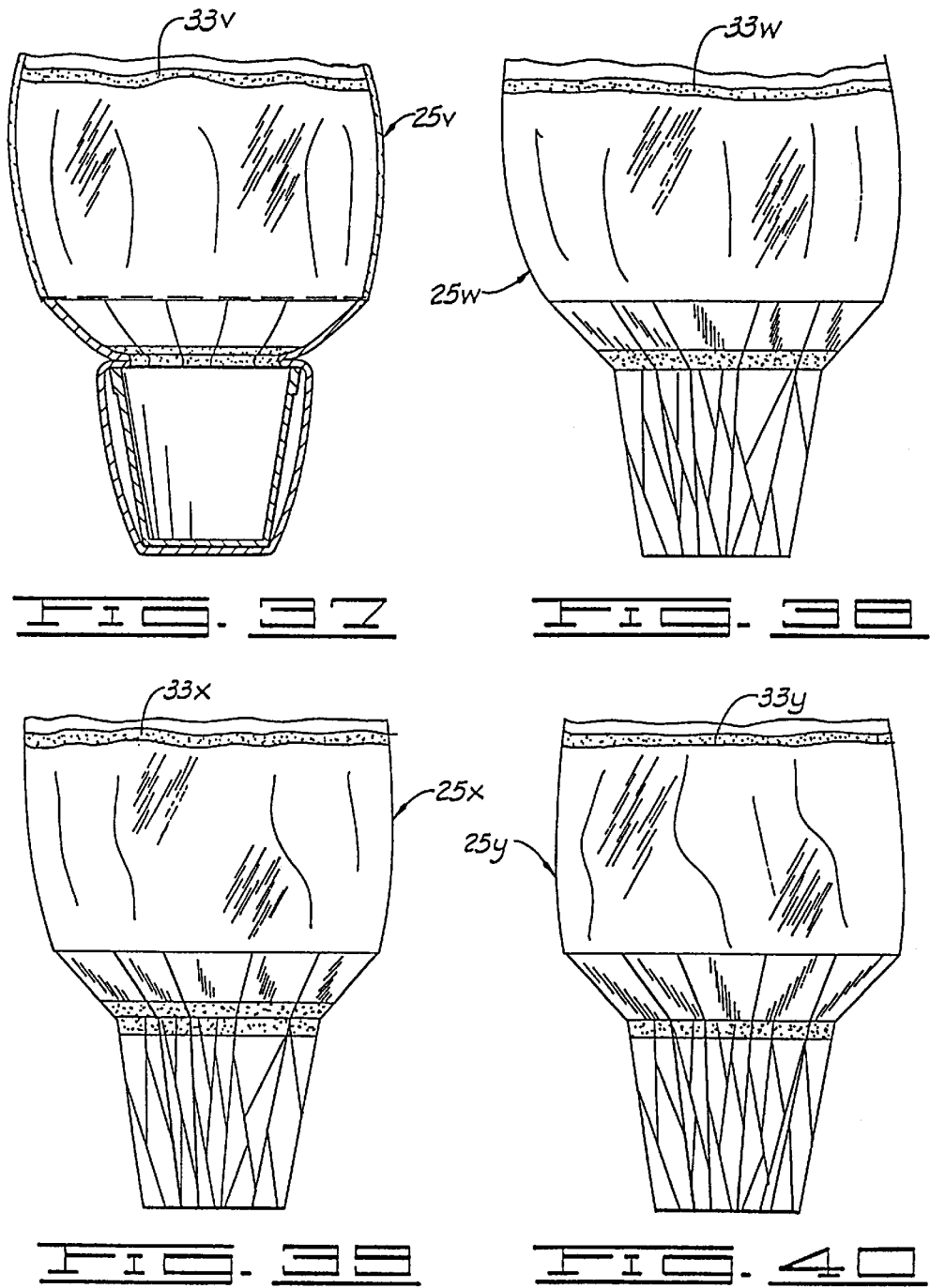

METHOD OF COVERING FOR FLOWER POT AND FLORAL GROUPING

RELATED REFERENCES

The present application is a continuation of U.S. Ser. No. 08/468,112, filed Jun. 6, 1995, entitled "Covering For Flower Pot and Floral Grouping", now U.S. Pat. No. 5,625,936, which is a continuation of U.S. Ser. No. 08/037,067, filed Mar. 25, 1993, entitled "Covering For Flower Pot and Floral Grouping", now U.S. Pat. No. 5,542,169, which is a continuation-in-part of U.S. Ser. No. 07/926,098, filed Aug. 5, 1992, entitled "Method and Apparatus for Forming a Decorative Cover" now U.S. Pat. No. 5,809,629.

FIELD OF THE INVENTION

The present invention relates generally to coverings for flower pots and floral groupings and, more particularly, but not by way of limitation, to a covering having a portion extending about a flower pot for providing a decorative covering and another portion extending about the floral grouping disposed in the flower pot for providing a protective covering for the floral grouping.

BRIEF DESCRIPTION OF THE DRAWINGS

FIG. 1 is a plan view showing the upper surface of a sheet of material with a sheet extension connected thereto constructed in accordance with the present invention.

FIG. 2 is a sectional view showing the sheet of material of FIG. 1 formed about a flower pot and the sheet extension formed about a floral grouping to provide a protective covering.

FIG. 3 is an elevational view showing the sheet of material formed about the flower pot as shown in FIG. 2 with the flower pot not being shown in FIG. 3 and showing the sheet extension wrapped about the floral grouping.

FIG. 4 is a sectional view of a portion of the sheet of material crimped to form an overlapping fold.

FIG. 5 is a plan view of the lower surface of a modified sheet of material having a sheet extension connected thereto.

FIG. 6 is a sectional view showing a portion of the sheet of material of FIG. 5 crimped to form an overlapping fold.

FIG. 7 is a sectional view showing a sheet of material wrapped about a flower pot to form a modified decorative covering and showing the sheet extension formed about a floral grouping to provide a protective covering.

FIG. 8 is a plan view of the upper surface of another modified sheet of material and showing a modified sheet extension connected thereto.

FIG. 9 is a sectional view of the sheet of material and sheet extension of FIG. 8.

FIG. 10 is a plan view of the upper surface of yet another modified sheet of material with a sheet extension connected thereto.

FIG. 11 is a sectional view showing the modified sheet of material of FIG. 10 formed about a flower pot and the sheet extension formed about a floral grouping.

FIG. 12 is a plan view of the upper surface of still another modified sheet of material with a modified sheet extension connected thereto.

FIG. 13 is a sectional view of the sheet of material and the sheet extension of FIG. 12.

FIG. 14 is a plan view of the upper surface of still another modified sheet of material with a modified sheet extension connected thereto.

FIG. 15 is a sectional view of the sheet of material and the sheet extension of FIG. 14.

FIG. 16 is a plan view of the lower surface of still another modified sheet of material with a sheet extension connected thereto.

FIG. 17 is a sectional view of the sheet of material of FIG. 16 formed about a flower pot and the sheet extension formed about a floral grouping.

FIG. 18 is an end elevational view of a pad of sheets of material with sheet extension connected thereto constructed in accordance with the present invention.

FIG. 19 is a diagrammatic, end elevational view of a roll of material for providing sheets of material with sheet extension connected thereto in accordance with the present invention.

FIG. 20 is a perspective view of the roll of material for providing sheets of material with sheet extension connected thereto in accordance with the present invention.

FIG. 21 is a plan view of the upper surface of yet another modified sheet of material with a sheet extension connected thereto.

FIG. 22 is a sectional view showing the sheet of material of FIG. 21 formed about a flower pot and the sheet extension formed about a floral grouping.

FIG. 23 is a sectional view of the sheet of material of FIG. 21 wrapped about a flower pot with the section taken along the horizontal plane as compared to the section taken along the vertical plane shown in FIG. 22.

FIG. 24 is an elevational view of a modified flower pot for cooperating to connect the sheet of material thereto.

FIG. 25 is a sectional view showing a sheet of material wrapped about a flower pot for forming yet another modified decorative cover with a sheet extension connected thereto.

FIG. 26 is a perspective view of a modified flower pot for cooperating to secure a sheet of material wrapped thereabout to form a modified decorative cover like the decorative cover shown in FIG. 25.

FIG. 27 is a plan view of the lower surface of still another modified sheet of material having a ribbon connected thereto and showing a sheet extension connected thereto with a ribbon connected to the sheet extension.

FIG. 28 is a sectional view of the modified sheet of material with the sheet extension connected thereto shown in FIG. 27.

FIG. 29 is a front elevational view of the sheet of material of FIG. 27 wrapped about a flower pot (not shown) to form another modified decorative covering and the sheet extension formed about the floral grouping to provide a protective covering.

FIG. 30 is a sectional view of a flower pot with a floral grouping disposed therein and showing a sheet of material wrapped about the flower pot and secured thereto with a band, the sheet of material having a sheet extension connected thereto formed about the floral grouping for providing a protective covering.

FIG. 31 is a perspective view of a flower pot cover with a sheet extension constructed in accordance with the present invention.

FIG. 32 is an elevational view of the flower pot cover of FIG. 1 with the sheet extension connected thereto.

FIG. 33 is a sectional view of a flower pot with the flower pot cover of FIGS. 1 and 2 placed thereabout and with a crimped portion formed in the flower pot cover and with the sheet extension connected thereto.

FIG. 34 is a perspective view of a modified flower pot cover with a sheet extension connected thereto constructed in accordance with the present invention.

FIG. 35 is a sectional view showing the flower pot cover of FIG. 5 placed about a flower pot with the flower pot cover having a crimped portion formed therein, the flower pot cover having the sheet extension connected thereto.

FIG. 36 is a perspective view of yet another modified flower pot cover with a sheet extension connected thereto.

FIG. 37 is a sectional view showing the flower pot cover of FIG. 8 disposed about a flower pot with a crimped portion being formed in the flower pot cover and showing the sheet extension formed about the floral grouping.

FIG. 38 is an elevational view of still another modified flower pot cover with the sheet extension connected thereto.

FIG. 39 is an elevational view of still another modified flower pot cover with the sheet extension connected thereto.

FIG. 40 is an elevational view of still another modified flower pot cover with a sheet extension connected thereto.

DESCRIPTION OF THE PREFERRED EMBODIMENTS

Shown in FIG. 1 and designated by the general reference number 10 is a sheet of material constructed in accordance with the present invention.

The sheet of material 10 includes a first end 12, a second end 14, a first side 16 and a second side 18. The sheet of material 10 also includes an upper surface 20 (FIG. 1) and a lower surface 22 (FIG. 2).

A connecting bonding material 24 is disposed on the upper surface 20 of the sheet of material 10. The sheet of material 10 has an outer peripheral edge 26. The connecting bonding material 10 is disposed near and spaced a distance 28 from the outer peripheral edge 26 of the sheet of material 10 and extends generally circumferentially about the sheet of material 10.

The sheet of material 10 shown in FIG. 1 is generally circularly shaped and the connecting bonding material 24 extends in a circularly shaped pattern over a portion of the upper surface 20 of the sheet of material 10. The sheet of material 10 may be any geometric shape such as square or rectangular or heart shaped or trapezoidally shaped or any other geometric shape. Further, the connecting bonding material 24 may extend in any geometric pattern over the upper surface 20 of the sheet of material 10, and the circularly shaped pattern is shown in FIG. 1 only by way of example.

A sheet extension 25 is connected to the sheet of material 10. The sheet extension 25 extends about the outer peripheral edge 26 of the sheet of material 10. The sheet extension 25 extends outwardly from the sheet of material 10 terminating with an outer peripheral edge 27. The sheet extension 25 has an upper surface 29 (FIG. 1) and a lower surface 31 (FIG. 2). The upper surface 29 is disposed in a plane about coplanar with the upper surface 20 of the sheet of material 10 and lower surface 31 is disposed in a plane about coplanar with the lower surface 22 of the sheet of material 10.

The sheet extension 25 and the sheet of material 10 may be integrally constructed of a single sheet of material or the sheet extension 25 may be laminated to the sheet of material 10. A connecting bonding material 33 is disposed on the upper surface 29 of the sheet extension 25. The connecting bonding material 33 is disposed near and spaced a distance from the outer peripheral edge 27 of the sheet extension 25 and extends generally circumferentially about the sheet extension 25.

The sheet extension 25 is shown in FIG. 1 as being circularly shaped. The sheet extension 25 may be any geometric shape such as a square or rectangular or heart shaped or trapezoidally shaped or any other geometric shape and the geometric shape of the sheet extension 25 may be the same as the geometric shape of the sheet of material 10 or the sheet extension 25 may have a geometric shape different from the geometric shape of the sheet of material 10. Further, although the sheet extension 25 is shown in FIG. 1 as extending circumferentially about the outer peripheral surface 26 of the sheet of material 10, the sheet extension 25 may extend only about a portion of the outer peripheral edge 26 of the sheet of material 10 or the sheet extension 25 may comprise segments with each segment extending about a portion of the outer peripheral edge 26 of the sheet of material 10.

The sheet of material 10 and the other sheets of material and the sheet extension 25 and the other sheet extensions described herein are constructed from any suitable flexible material that is capable of being wrapped or formed about a flower pot or a floral grouping as described herein. Preferably, the sheet of material 10 and the sheet extension 25 are constructed of a material selected from a group of materials consisting of paper, metal foil, cloth (natural or synthetic or combinations thereof), denim, burlap or polymer film or combinations thereof.

The term "polymer film" as used herein means any polymer film. For example, but not by way of limitation, one polymer film is a polypropylene film. Another example of a polymer film, but not by way of limitation, is cellophane.

The sheet of material 10 and the sheet extension 25 each have a thickness in a range from about 0.1 mils to about 30 mils. Preferably, the sheet of material 10 and the sheet extension 25 each have has a thickness in a range from about 0.1 mils to about 5 mils.

The sheet of material 10 and the sheet extension 25 may be constructed of a single layer of material or a plurality of layers of the same or different types of materials. Any thickness of the sheet of material 10 and the sheet extension 25 may be utilized in accordance with the present invention as long as the sheet of material 10 and the sheet extension 25 are wrappable or formable about a flower pot or a floral grouping in the manners described herein. The layers of material comprising the sheet of material 10 and the sheet extension 25 may be connected together or laminated or may be separate layers.

A decorative pattern, such as a color and/or an embossed pattern, and/or other decorative surface ornamentation may be applied to the upper surface 20 and/or the lower surface 22 of the sheet of material 10 or portions thereof including, but not limited to printed design, coatings, colors, flocking or metallic finishes. The sheet of material 10 also may be totally or partially clear or tinted transparent material.

A decorative pattern, such as a color and/or an embossed pattern, and/or other decorative surface ornamentation may be applied to the upper surface 29 and/or the lower surface 31 of the sheet extension 25 or portions thereof including, but not limited to, printed design, coatings, colors, flocking or metallic finishes. The sheet extension 25 also may be totally or partially clear or tinted transparent material. In one preferred embodiment the sheet of material 10 has a decorative pattern applied to the upper surface 20 and/or the lower surface 22 while the sheet extension is totally or partially clear or tinted transparent. The sheet extension 25 is shown in the drawings as being transparent.

The term "bonding material" as used herein means an adhesive, preferably a pressure sensitive adhesive, or a cohesive. Where the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" as used herein also means a heat sealing lacquer which may be applied to the sheet of material and, in this instance, heat also must be applied to effect the sealing. The term "bonding material" as used herein means any type of material or thing which can be used to effect the bonding or connecting of the two adjacent portions of the sheet of material 10 to effect the connection or bonding described herein. The term "bonding material" also includes other forms of effecting the bonding described herein such as chemical welds or heat fusion or welding by way of example only.

The connecting bonding materials 24 and 33 are shown in FIG. 1 as being applied to the upper surface 20 of the sheet of material 10 or the upper surface 29 of the sheet extension 25 in the form of a circularly shaped strip. The connecting bonding materials 24 or 33 may be applied in the form of spots or spaced apart strips and the spots may be any geometric pattern or any other type of pattern such as a logo for example. Further, the connecting bonding materials 24 or 33 may include a color to obscure the fact that the connecting bonding materials 24 and 33 are disposed on the sheet of material 10 or the sheet extension 25.

Shown in FIG. 2 is a flower pot 30 having an upper end 32, a lower end 34 and an outer peripheral surface 36. An opening 38 is formed through the upper end 32 of the flower pot 30 providing access to a retaining space 40. The retaining space 40 is sized to accommodate growing medium such as soil for example and at least a portion of a botanical item such as a plant or flower for example.

The retaining space 40 forms an inner peripheral surface 42 in the flower pot 30. A bottom 44 of the flower pot 30 is disposed at the lower end 34 and cooperates to enclose or partially enclose the retaining space 40. The flower pot 30 may be any conventional, commercially available container well known in the art.

Growing medium 45 is shown in FIG. 2 disposed in the retaining space 40 and a floral grouping 47 is shown in FIG. 2 partially disposed in the growing media 45. A portion of the floral grouping 47 extends a distance upwardly above the upper end 32 of the flower pot 30.

"Floral grouping" as used herein means any botanical item such as flowers or plants or trees or the like, or a single flower or a single plant or a single tree or the like, and may include other floral materials and may include other secondary plants and/or ornamentation which add to the aesthetics of the overall floral grouping. The botanical item may be a growing flower, plant or tree or the like, or may be an artificial flower plant or tree or the like.

The flower pot 30 is placed on the upper surface 20 of the sheet of material 10. More particularly, the bottom 44 of the flower pot 30 is disposed on a central portion of the sheet of material 10. In this position, the connecting bonding material 24 extends circumferentially about the flower pot 30 and the connecting bonding material 24 is spaced a distance from the flower pot 30.

The sheet of material 10 then is formed about the flower pot 30 to a position wherein the sheet of material 10 extends about and encompasses substantially the entire outer peripheral surface 36 of the flower pot 30, including the bottom 44. It should be noted that the sheet of material 10 does not have to cover the bottom 44. In this position, a portion of the sheet of material 10 is disposed adjacent the bottom 44 of the flower pot 30 and portions of the sheet of material 10 extend upwardly and encompass the entire outer peripheral surface 36 of the flower pot 30 between the upper end 32 and the lower end 34 of the flower pot 30. In one embodiment, the portions of the sheet of material 10 extending over the outer peripheral surface 36 are spaced a distance from the outer peripheral surface 36 of the flower pot 30 to provide a blossom type affect.

When the sheet of material 10 is formed about the flower pot 30, a portion of the sheet of material 10 near the outer peripheral surface 36 thereof extends a distance above the upper end 32 of the flower pot 30 as shown in FIG. 2. Further, when the sheet of material 10 is formed about the flower pot 30, the sheet of material 10 is sized and the connecting bonding material 24 is positioned on the upper surface 20 of the sheet of material 10 so that the connecting bonding material 24 is disposed a distance above the upper end 32 of the flower pot 30.

In this position, the portion of the sheet of material 10 disposed near and about the connecting bonding material 24 is crimped by bringing together portions of the sheet of material 10 near and about the connecting bonding material 24 so that portions of the sheet of material 10 near and about the connecting bonding material 24 are disposed adjacent each other and the adjacent portions of the sheet of material 10 are connected by way of the connecting bonding material 24 thereby forming a plurality of overlapping folds 49 in the portion of the sheet of material 10 near and about the connecting bonding material 24. The connected overlapping folds 49 extend at various distances and at various angles. The connected overlapping folds 49 (FIGS. 2 and 3) in the area near and about the portion of the sheet of material 10 containing the connecting bonding material 24 is designated in FIG. 2 by the reference numeral 46 and sometimes referred to herein as the crimped portion 46 (FIGS. 2 and 3).

A typical section showing a portion of a typical overlapping fold 49 is shown in FIG. 4. The adjacent portions of the sheet of material 10 on the upper surface 20 are shown in FIG. 4 as being connected while the adjacent portions of the sheet of material 10 on the lower surface 22 are unconnected since no bonding material is disposed on the lower surface 22. It should be noted that connecting bonding material also can be disposed on the lower surface 22 for connecting adjacent portions of the lower surface 22 in the crimped portion 46 if desired and as described in more detail below.

The crimped portion 46 extends circumferentially about the upper end 32 of the flower pot 30. The crimped portion 46 also extends a distance inwardly from the upper end 32 of the flower pot 30 toward a central portion of the retaining space 40 thereby forming a ridge portion 48 extending circumferentially about the flower pot 30 generally near the upper end 32 of the flower pot 30. The crimped portion 46 and the ridge portion 48 thereof cooperate to engage the upper end 32 of the flower pot 30 to assist and cooperate in holding the sheet of material 10 formed about the flower pot 30 to provide a decorative cover 50 (FIGS. 2 and 3).

The crimped portion 46 when formed preferably causes adjacent portions of the upper and lower surfaces 20 and 22 of the sheet of material 10 to be brought together or positioned adjacent each other. The crimped portion 46 and the other crimped portions shown in the drawings are shown in an expanded form where the portions of the lower surface 22 are not disposed adjacent each other for the purpose of illustration and because this expanded form may be desired in some applications.

The portion of the sheet of material 10 extending between the connecting bonding material 24 and the outer peripheral edge 26 of the sheet of material 10 extends a distance above the crimped portion 46 and is flared outwardly and extends a distance radially outwardly from the crimped portion 46 to form a flared portion 52. The flared portion 52 extends circumferentially about the decorative cover 50 and circumferentially about the upper end 32 of the flower pot 30.

In this embodiment, the connecting bonding material 24 preferably is a pressure sensitive adhesive or a cohesive, although the connecting bonding material 24 could be in any of the other forms described before.

The upper surface 20 of the sheet of material 10 forms the inner peripheral surface of the decorative cover 50 and the lower surface 22 of the sheet of material 10 forms the outer peripheral surface of the decorative cover 50. The inner peripheral surface of the decorative cover 50 formed by the upper surface 20 of the sheet of material 10 is disposed adjacent the bottom 44. The inner peripheral surface of the decorative cover 50 formed by the upper surface 20 is spaced a distance from the outer peripheral surface 36 of the flower pot 30.

As described above, the flower pot 30 was placed on the upper surface 20 of the sheet of material 10 and then formed about the sheet of material 10 to form the decorative cover 50 with the upper surface 20 being disposed near the outer peripheral surface 36 of the flower pot 30 and the lower surface 22 providing the outer surface of the decorative cover 50. In the alternative, the flower pot 30 may be placed on the lower surface 22 of the sheet of material 10. In this last-mentioned embodiment, the sheet of material 10 is formed about the flower pot 30 in the manner exactly like that described before, except the lower surface 22 is disposed near the outer peripheral surface 36 of the flower pot 30 and the upper surface 20 forms the outer surface of the decorative cover 50 with the connecting bonding material 24 being disposed on the outer surface of the decorative cover 50.

Either before or after or during the forming of the crimped portion 46, the sheet extension 25 is formed about the floral grouping 47 to a position wherein the sheet extension 25 encompasses a substantial portion of the floral grouping 47, as shown in FIGS. 2 and 3. The sheet extension 25 extends upwardly about the floral grouping 47 with a portion of the sheet extension 25 extending upwardly beyond the upper end of the floral grouping 47 terminating with the outer peripheral surface 27 of the sheet extension 25 and forming an open upper end. In this position of the sheet extension 25, portions of the sheet extension 25 near the outer peripheral surface 27 (the open upper end) thereof are brought into contact thereby bringing the bonding material 33 into contact and engagement with adjacent portions of the sheet extension 25 for closing the sheet extension 25 about or above an upper end of the floral grouping 47.

In a preferred form, a line of perforations 53 (FIGS. 1 and 3) is formed between the sheet of material 10 and the sheet extension 25. The line of perforations 53 extends generally about the outer peripheral edge 26 of the sheet of material 10. The sheet extension 25 encompasses the floral grouping 47 and provides a protective covering for the floral grouping 47 to protect the floral grouping 47 during shipment and/or storage. When it is desired to remove the protective covering provided by the sheet extension 25, the operator tears the sheet extension 25 along the line of perforations 53 thereby severing or separating the sheet extension 25 from the sheet of material 10 so that the sheet extension 25 can be removed from the sheet of material 10 or, in other words, the protective covering may be removed from the decorative covering by tearing along the line of perforations 53.

EMBODIMENT OF FIGS. 5 AND 6

Shown in FIG. 5 is a modified sheet of material 10a which is constructed exactly like the sheet of material 10 shown in FIG. 1 and described in detail before, except the sheet of material 10a includes a cohesive or pressure sensitive adhesive connecting bonding material 54 disposed on the lower surface 22a of the sheet of material 10a. The cohesive or pressure sensitive adhesive connecting bonding material 54 extends circumferentially about the lower surface 22a. The cohesive or pressure sensitive adhesive connecting bonding material 54 is spaced a distance 56 from the outer peripheral edge 26a of the sheet of material 10a. Preferably, the distance 56 corresponds or equals the distance 28 described before in connection with the sheet of material shown in FIG. 1.

The sheet of material 10a includes the connecting bonding material 54 (preferably a pressure sensitive adhesive or cohesive connecting bonding material) on the upper surface 20a of the sheet of material 10a exactly like that described before in connection with the sheet of material 10 shown in FIG. 1.

The sheet extension 25a is constructed exactly like the sheet extension 25 shown in FIGS. 1 through 3 and described in detail before, except the sheet extension 25a includes the connecting bonding material 33a disposed on the lower surface 31a of the sheet extension 25a.

In this embodiment, the sheet of material 10a is formed about the flower pot 30 in a manner exactly like that described before in connection with the sheet of material 10 formed about the flower pot 30 as shown in FIG. 2, except in this embodiment, when the crimped portion like the crimped portion 46 (FIG. 2) is formed, the adjacent portions of the sheet of material 10a in the area containing the connecting bonding material 54 also will be bondingly connected (FIG. 6). Thus, in this embodiment, the adjacent portions of the sheet of material 10a on the upper surface 20a and the lower surface 22a are bondingly connected by way of the respective connecting bonding material 24 or the cohesive connecting bonding material 54.

The sheet extension 25a is formed about the floral grouping 47 in a manner exactly like that described before in connection with FIGS. 1 through 3, except the bonding material 33a on the lower surface 31a is brought into bonding engagement with adjacent portions of the sheet extension 25a to close the open upper end of the protective covering provided by the sheet extension 25a.

EMBODIMENT OF FIG. 7

Shown in FIG. 7 is another modified sheet of material 10b which is constructed exactly like the sheet of material 10 shown in FIGS. 1–4 and described in detail before, except, in this embodiment, the crimped portion 46b extends a distance radially outwardly and circumferentially about the upper end 32 of the flower pot 30. The sheet of material 10b is formed about the flower pot 30 in the manner exactly like that described before with respect to the sheet of material 10 shown in FIGS. 1–4 and described in detail before, except the crimped portion 46b is formed to extend radially outwardly as opposed to radially inwardly in the manner described before in connection with the sheet of material 10 in the crimped portion 46 (FIGS. 1–4).

It should be noted that in connection with the sheet of material 10, 10a or 10b, the bottom 44 of the flower pot 30 may be placed on the lower surface 22 and the sheet of material 10, 10a or 10b and then formed about the flower pot 30 in the manner described before with the upper surface 20 forming the outer peripheral surface of the decorative cover 50 in lieu of the lower surface 22 forming the outer peripheral surface of the decorative cover 50 in the manner described before in connection with the embodiments shown in FIGS. 1–7.

The sheet extension 25b is constructed exactly like the sheet extension 25 shown in FIGS. 1 through 4 and described in detail before.

EMBODIMENT OF FIGS. 8 AND 9

Shown in FIGS. 8 and 9 is another modified sheet of material 10c which is constructed exactly like the sheet of material 10 shown in FIGS. 1–4 and described in detail before, except the sheet of material 10c does not include the connecting bonding material 24. The sheet of material 10c includes a drawstring 58. The drawstring 58 is connected to the sheet of material 10c. The drawstring 58 has opposite ends 60 and 62. Portions of the drawstring 58 near each of the opposite ends 60 and 62 thereof exit through respective openings 64 and 66 formed in the upper surface 20c of the sheet of material 10c.

The drawstring 58 extends circumferentially about the sheet of material 10c and the drawstring 58 is spaced a distance 68 from the outer peripheral edge 26 of the sheet of material 10c.

The drawstring 58 may be connected to the sheet of material 10c in any suitable manner so desired in any particular application. In one preferred embodiment, the sheet of material 10c comprises a first sheet 70 and a second sheet 72 (FIG. 9). The drawstring 58 is disposed between the first and the second sheets 70 and 72 and the first and the second sheets 70 and 72 then are bondingly connected or laminated to form the sheet of material 10c. Portions of the first and the second sheets 70 and 72 near the drawstring 58 are left unconnected so that the drawstring 58 may slidingly move between the first and the second sheets 70 and 72. The openings 64 and 66 more particularly are formed through a portion of the first sheet 70. The first and the second sheets 70 and 72 are constructed of materials exactly like that described before with respect to the sheet of material 10.

The sheet extension 25c is constructed exactly like the sheet extension 25 shown in FIGS. 1 through 4 and described in detail before, except the sheet extension 25 does not include the connecting bonding material 33, although it could also include bonding material if desired.

The sheet extension 25c includes a drawstring 57. The drawstring 57 is connected to the sheet extension 25c. The drawstring 57 has opposite ends 59 and 61. Portions of the drawstring 57 near each of the opposite ends 59 and 61 exit through respective openings 63 and 65 formed in the upper surface 29c of the sheet extension 25c.

The drawstring 57 extends circumferentially about the sheet extension 25c. The drawstring 57 is spaced a distance from the outer peripheral surface 27c of the sheet extension 25c.

The drawstring 57 may be connected to the sheet extension 25c in any suitable manner so desired in any particular application. In one preferred embodiment, the sheet extension 25c is formed by —a extending the first and the second sheets 70 and 72 (FIG. 9). The drawstring 57 is disposed between the first and the second sheets 70 and 72 and the first and the second sheets then are bondingly connected or laminated to form the sheet of material 10c and the sheet extension 25c. Portions of the first and the second sheets 70 and 72 near the drawstring 57 are left unconnected so the drawstring may slidingly move between the first and the second sheet 70 and 72. The opening 63 and 65 more particularly are formed through a portion of the first sheet 70.

The sheet of material 10c is formed about the flower pot 30 in the manner exactly like that described before with respect to the sheet of material 10 shown in FIGS. 1–4 and described in detail before. The drawstring 58 is positioned on the sheet of material 10c and the sheet of material 10c is sized and shaped so that, when the sheet of material 10c is formed about the flower pot 30, the drawstring 58 is disposed above the upper end 32 of the flower pot 30. In this position, the ends 60 and 62 of the drawstring 58 are pulled thereby drawing the portions of the sheet of material 10c generally near the drawstring 58 inwardly and crimping the portions of the sheet of material near the drawstring 58 to form the crimped portion like the crimp portion 46 shown in FIGS. 2 and 3. The ends 60 and 62 of the drawstring 58 then are tied or otherwise secured to maintain the crimped portion formed in the decorative covering formed by the sheet of material 10c.

The sheet extension 25c is formed about the floral grouping 47 to a position wherein the sheet extension 25c extends about a substantial portion of the floral grouping 47. In this position, the ends 59 and 61 of the drawstring 57 are pulled thereby drawing portions of the sheet extension 25c generally near the drawstring 57 inwardly closing the open upper end of the sheet extension 25c about the floral grouping. The ends 61 and 59 then are tied or otherwise secured to maintain the sheet extension 25c extending about the floral grouping to provide the protective covering. The sheet extension 25c may be separated from the decorative cover formed by the sheet of material 10c by tearing along the line of perforations 53c.

The decorative covering formed by the sheet of material 10c will look like the decorative covering 50 shown in FIGS. 2 and 3, except the crimped portion 46 is formed by pulling the drawstring 58 and the resulting adjacent portions of the sheet of material 10c are not bondingly connected in the manner described before with respect to the decorative cover 50. It should be noted that the sheet of material 10c also could include a cohesive or pressure sensitive adhesive bonding material on the upper surface 20c of the sheet of material 10c exactly like that described before with respect to the connecting bonding material 24 on the sheet of material 10 (FIGS. 1–4). In this embodiment, the adjacent portions of the sheet of material 10c formed when the drawstring 58 is pulled to form the crimped portion, also would be bondingly connected in a manner like that described before with respect to the decorative cover 50 and the crimped portion 46 (FIGS. 1–4). Also, the sheet of material 10c can be constructed like the sheet of material 10a shown in FIGS. 5 and 6 and described in detail before so that the adjacent portions of the lower surface 22c also are connected when the drawstring 58 is pulled to form the crimped portion.

EMBODIMENT OF FIGS. 10 AND 11

Shown in FIGS. 10 and 11 is a modified sheet of material 10d which is constructed exactly like the sheet of material 10 shown in FIGS. 1–4 and described in detail before, except the sheet of material 10d also includes a pot connecting bonding material 80 disposed on the upper surface 20d of the sheet of material 10d. The pot connecting bonding material 80 extends circumferentially about the sheet of material 10d. The pot connecting bonding material 80 is spaced a distance 82 from the outer peripheral edge 26d of the sheet of material 10d and the distance 82 is greater than the distance 83 between the connecting bonding material 24d and the outer peripheral edge 26d. The pot connecting bonding material 80 is spaced a distance 84 from the connecting bonding material 24d.

The sheet of material 10d is formed about the flower pot 30 in a manner exactly like that described before in connection with the sheet of material 10 shown in FIGS. 1–4, except, in this embodiment, the pot connecting bonding material 80 is positioned on the sheet of material 10d so that, when the sheet of material 10d is formed about the flower pot 30, the pot connecting bonding material 80 is disposed near the outer peripheral surface 36 and near the upper end 32 of the flower pot 30. In this position, the portions of the sheet of material 10d having the pot connecting bonding material 80 disposed thereon are pressed or positioned against the outer peripheral surface 36 of the flower pot 30 so that the pot connecting bonding material 80 bondingly engages and bondingly connects a portion of the sheet of material 10d to the outer peripheral surface 36 of the flower pot 30 generally near and adjacent the upper end 32 of the flower pot 30 for bonding a portion of the sheet of material 10d to the flower pot 30.

The sheet of material 10d thus is bonded to the flower pot 30 by way of the pot connecting bonding material 80 and the connection between the sheet of material 10d and the flower pot 30 extends circumferentially about the flower pot 30 generally near and adjacent the upper end 32 thereof.

In this embodiment, the crimped portion 46d and the ridge portion 48d cooperate to secure the sheet of material 10d in the form of the decorative cover 50d formed about the flower pot 30 and the pot connecting bonding material 80 also cooperates to maintain the sheet of material 10d in the form of the decorative cover 50d positioned about the flower pot 30. The pot connecting bonding material 80 thus augments the crimped portion 46d and the ridge portion 48d in maintaining the sheet of material 10d in the form of the decorative cover 50d secured about the flower pot 30.

The sheet of material 10d also could be constructed like the sheet of material 10a if desired. The sheet of material 10d also could be constructed like the sheet of material 10b to form the decorative cover 50b in a manner like that described before with respect to FIG. 7 if desired in a particular application. The sheet of material 10d also could include the drawstring in the manner described before with respect to the drawstring 58 shown in FIGS. 8 and 9 if desired in a particular application.

The sheet of material 10d is connected to the sheet extension 25d and the sheet extension 25d is constructed exactly like the sheet extension 25 shown in FIGS. 1 through 4 and described in detail before. The sheet extension 25d is formed about the floral grouping 47 to provide the protective covering in the manner exactly like that described before in connection with FIGS. 1 through 4. The sheet extension 25d is shown in FIG. 11 formed about the floral grouping 47.

EMBODIMENT OF FIGS. 12 AND 13

Shown in FIGS. 12 and 13 is another modified sheet of material 10e, which is constructed exactly like the sheet of material 10 shown in FIGS. 1–4 and described in detail before, except the sheet of material 10e does not necessarily include the connecting bonding material like the connecting bonding material 24 on the sheet of material 10 shown in FIGS. 1–4. The sheet of material 10e includes reinforcing means 86 connected to the sheet of material 10e. The reinforcing means 86 more particularly comprises a plurality of reinforcing elements with two reinforcing elements 88 and 90 being shown in FIGS. 12 and 13 by way of example. Each of the reinforcing elements 88 and 90 are connected to the sheet of material 10e. The reinforcing elements 88 and 90 each extend circumferentially about the sheet of material 10e. The reinforcing elements 88 and 90 are spaced about a distance 92 from the outer peripheral surface 26e of the sheet of material 10e.

The reinforcing elements 88 and 90 may be connected to the sheet of material 10e in any suitable manner. Preferably, the sheet of material 10e is formed using a first sheet 94 and a second sheet 96 (FIG. 13) with the reinforcing elements 88 and 90 being disposed between the first and the second sheets 94 and 96. In this position, the first and the second sheets 94 and 96 are bondingly connected or laminated together to form the sheet of material 10e. The first and the second sheets 94 and 96 are constructed of any of the materials described before in connection with the sheet of material 10 shown in FIGS. 1–4.

In this embodiment, the sheet of material 10e is formed about the flower pot 30 in the manner exactly like that described before in connection with the sheet of material 10 shown in FIGS. 1–4, except the crimped portion is maintained in the formed position by way of the reinforcing elements 88 and 90 which cooperate to maintain the portion of the sheet of material 10e in a crimped position to form the crimped portion such as the crimped portion 46 shown in FIGS. 2 and 3 and described in detail before.

The reinforcing elements 88 and 90 may be constructed of any type of material capable of maintaining the shape of the crimped portion of the decorative cover like the crimped portion 46 of the decorative cover 50 described before. The reinforcing elements 88 and 90 may be wire elements for example or plastic rods and the reinforcing elements 88 and 90 may be continuous as illustrated in FIG. 12 or in the form of segments as may be desired in a particular application.

It also should be noted that the sheet of material 10e can be formed about the flower pot 30 to provide a decorative covering like the decorative covering 50b shown in FIGS. 7 and described in detail before. It also should be noted that the sheet of material 10e may include connecting bonding material like the connecting bonding material 24 and/or connecting bonding material like the connecting bonding material 54 if desired in a particular application. In some instances, it also may be desirable to include a drawstring with the sheet of material 10e like the drawstring 58 shown in FIGS. 8 and 9 and described in detail before. It also should be noted that the sheet of material 10e may include pot connecting bonding material like the pot connecting bonding material 80 shown in FIGS. 10 and 11 for forming a decorative cover like the decorative covering 50d shown in FIG. 11 if desired in a particular application.

The sheet of material 10e includes a sheet extension 25e. The sheet extension 25e is constructed exactly like the sheet extension 25 shown in FIGS. 1 through 4 and described in detail before, except the sheet extension 25e does not include a connecting bonding material, although it could include connecting bonding material if desired. Rather, the sheet extension 25e includes reinforcing means. The reinforcing means more particularly comprises a reinforcing element 87. The reinforcing element 87 is connected to the sheet extension 25e in a manner like that described before in connection with the reinforcing elements 88 and 90.

The sheet extension 25e is formed about the floral grouping in a manner like that described before in connection with the sheet extension 25 shown in FIGS. 1 through 4. The open upper end of the sheet extension 25 which extends above the upper end of the floral grouping is closed by bending and twisting the portion of the sheet extension 25e having the reinforcing element 87 therein. The reinforcing element 87 cooperates to maintain the open upper end of the sheet extension 25e closed over the floral grouping to provide the protective cover.

EMBODIMENT OF FIGS. 14 AND 15

Shown in FIGS. 14 and 15 is yet another modified sheet of material 10f which is constructed exactly like the sheet of material 10 shown in FIGS. 1–4 and described in detail before, except the sheet of material 10f does not necessarily include a connecting bonding material like the connecting bonding material 24 described in detail before with respect to the sheet of material 10. The sheet of material 10f more particularly includes reinforcing means 98.

The reinforcing means 98 comprises a plurality of reinforcing elements 100 (only one of the reinforcing elements 100 being designated with the reference numeral in FIGS. 14 and 15). The reinforcing .elements 100 may be constructed of any material and any shape so long as the reinforcing elements 100 cooperate with the sheet of material 10f to reinforce the sheet of material 10f and assist in maintaining the formed shape of the sheet of material 10f. In one form, the reinforcing elements 100 may comprise a plurality of wire elements or plastic rod like elements for example. The reinforcing elements 100 may be continuous as shown in FIGS. 14 and 15 or may be segmented as may be desired in a particular application. The reinforcing elements 100 extend over substantially the entire surface of the sheet of material 10f.

The sheet of material 10f is formed about the flower pot 30 in the manner described before in X connection with FIG. 2 or 7, except, in this embodiment, the reinforcing elements 100 cooperate to maintain a portion of the sheet of material 10f formed in the form of the crimped portion like the crimped portion 46 or 46b in lieu of connecting bonding material.

The sheet of material 10f may include connecting bonding material like the connecting bonding material 24 or connecting bonding material like the cohesive connecting bonding material 54 if desired in a particular application. Also, the sheet of material 10f may include a drawstring like the drawstring 58 shown in FIG. 8 and described in detail before. Also, the sheet of material 10f may include a pot connecting bonding material like the pot connecting bonding material 80 shown in FIGS. 10 and 11 and described in detail before.

The sheet of material 10f includes the sheet extension 25f connected thereto. The sheet extension 25f includes reinforcing means 97. In one form, the reinforcing means 97 comprises a plurality of reinforcing elements 101. The reinforcing elements 101 may be continuous as shown in FIGS. 14 and 15 or may be segmented as may be desired in a particular application. The reinforcing elements 101 extend over substantially the entire surface of the sheet extension 25f.

The sheet extension 25f is formed about the floral grouping in a manner like that described before in connection with the sheet extension 25 shown in FIGS. 1 through 4. The open upper end of the sheet extension 25f then is closed over the upper end of the floral grouping to provide the protective covering. The reinforcing elements 101 cooperate to maintain the sheet extension 25f closed over the open upper end of the floral grouping.

The reinforcing elements 101 preferably are not continuous or part of the reinforcing elements 100 so that the sheet extension 25f may be separated from the sheet of material 10f by tearing along the line of perforations 53f. The sheet extension 25f may include a drawstring like the drawstring 57 shown in FIG. 8 and described in detail before.

EMBODIMENT OF FIGS. 16 AND 17

Shown in FIGS. 16 and 17 is still another modified sheet of material 10g which is constructed exactly like the sheet of material 10 shown in FIGS. 1–4 and described in detail before, except the sheet of material 10g does not include connecting bonding material like the connecting bonding material 24 on the sheet of material 10 shown in FIGS. 1–4. Rather, the sheet of material 10g includes a shrink material 102 disposed on the upper surface 20g of the sheet of material 10g. The shrink material 102 may be constructed of any material which shrinks when subjected to heat or liquid or some other outside force or fluid. Such materials are well known in the art.

The shrink material 102 extends circumferentially about the upper surface 20g of the sheet of material 10g. The shrink material 102 is spaced a distance 104 from the outer peripheral edge 26g of the sheet of material 10g.

The sheet of material 10g is formed about the flower pot 30 in the manner exactly like that described before in connection with FIGS. 2 or 7. The shrink material 102 is positioned on the sheet of material 10g and the sheet of material 10g is sized and shaped so that the shrink material 102 is positioned above the upper end 32 of the flower pot 30 when the sheet of material 10g is formed about the flower pot 30 in a manner like that described before with respect to the positioning of the connecting bonding material 24 on the sheet of material 10 (FIGS. 1–4). In this position, the shrink material 102 then is subjected to heat or any of the other means mentioned before causing the shrink material 102 to shrink thereby forming the crimped portion 46g (FIG. 17). The crimped portion 46g will operate in a manner exactly like that described before with respect to the crimped portion 46 on the decorative cover 50 (FIGS. 2 and 3).

The sheet of material 10g has the sheet extension 25g connected thereto. The sheet extension 25g is constructed exactly like the sheet extension 25 shown in FIGS. 1 through 4 and described in detail before.

The sheet extension 25g is formed about the floral grouping and a portion of the sheet extension 25g near the outer peripheral edge 27g is closed over the upper end of the floral grouping to a position wherein portions of the sheet extension 25g are bondingly contacted by the bonding material 33g to close the open upper end of the sheet extension 25g over the upper end of the floral grouping to provide the protective covering. The bonding material 33g may comprise shrink material.

EMBODIMENT OF FIG. 18

Shown in FIG. 18 is a plurality of sheets of material 10h (only one of the sheets of material 10h being designated with a reference numeral in FIG. 18 for example). The sheets of material 10h are positioned and connected together to form a pad 106. The sheets of material 10h may be constructed in any of the forms of sheets of material described herein.

Each of the sheets of material 10h includes the sheet extension 25h (only one of the sheet extensions 25h being designated with a reference numeral in FIG. 18 for example).

In this embodiment, one of the sheets of material 10h in the pad 106 is removed from the pad 106 and formed about the flower pot 30 to provide the decorative covering in any of the manners described herein. In the alternative, the flower pot 30 may be placed on one of the sheets of material 10h in the pad 106 and then formed about the flower pot 30 to provide the decorative cover in any of the manners described herein while simultaneously removing the sheet of material 10h from the pad 106. The sheet extensions 25h are formed about the floral grouping to provide the protective covering in the manners described before.

EMBODIMENT OF FIG. 19

Shown in FIG. 19 is a roll of material 108 generally supported. In this embodiment, material from the roll of material 108 is unrolled and pulled from the roll of material 108 in a direction 110 to unroll a portion of the material from the roll of material 108. When a predetermined amount of the material has been unrolled from the roll of material 108, a knife edge 112 is brought into cutting contact with a portion of the material unrolled from the roll of material 108 to sever a sheet of material from the roll of material. The knife edge 112 may be automatically actuated by an actuator 114 which may be a hydraulic cylinder for example or the knife edge 112 may be a manually actuated knife edge or a knife edge on the edge of a container which contains the roll of material 108 for example.

In this embodiment, the material in the roll of material 108 is constructed of any of the materials described herein with respect to any of the sheets of materials with the sheet extension connected thereto described herein to provide any of the sheets of material with the sheet extension connected thereto described herein. In this embodiment, the sheets of materials with the sheet extension connected thereto described herein are supplied in the form of the roll of material 108 and the sheets of material with the sheet extension connected thereto are severed from the roll of material 108 in the manner just described.

EMBODIMENT OF FIG. 20

Shown in FIG. 20 is a roll of material 116 which is generally supported. The material in the roll of material may be constructed of any of the materials described herein with respect to any of the sheets of materials described herein. As shown in FIG. 20, the roll of material 116 contains a Plurality of spaced apart bonding materials 24j disposed on the material and the roll of material. The material in the roll of material also contains a plurality of spaced apart perforations 118 (only one of the perforations 118 being designated with a reference numeral in FIG. 20). The perforations 118 separate the material in the roll of material 116 into a plurality of sheets of material 10j. Each of the sheets of material 10j are constructed exactly like the sheet of material 10 shown in FIGS. 1–4 and described in detail before.

Each of the sheets of material 10j has a sheet extension 25j connected thereto.

In this embodiment, the material is unrolled from the roll of material 116 to a desired length. A portion of the material in the roll of material 116 then is separated from the roll of material 116 by tearing the material along one of the perforations 118 to provide the sheet of material 10j with the sheet extension 25j, connected thereto. The sheet of material 10j then is wrapped or formed about the flower pot 30 in any of the manners described herein.

It should be noted that the sheet of material 10j has been described before as being constructed like the sheet of material 10 shown in FIGS. 1–4, although the sheet of material 10j could be constructed like any of the other sheets of material described herein if desired in a particular application.

EMBODIMENT OF FIGS. 21, 22 AND 23

Shown in FIG. 23 is a sheet of material 10k which is constructed exactly like the sheet of material 10 shown in FIG. 1 and described in detail before, except the sheet of material 10k also includes a plurality of strips of pot connecting bonding material 120 with the individual strips of the pot connecting bonding material 120 being designated in FIG. 21 by the individual reference numerals 120a, 120b, 120c, 120d and 120e.

The pot connecting bonding materials 120 are spaced a distance circumferentially apart about the sheet of material 10k. Each of the pot connecting bonding materials 120 extends from the connecting bonding material 24 a distance radially inwardly toward a central portion of the sheet of material 10k. The pot connecting bonding materials 120 preferably are pressure sensitive adhesive pot connecting bonding materials. The pot connecting bonding materials 120 also could be a cohesive, however, in this instance, a corresponding cohesive pot connecting bonding material also would be disposed on the flower pot 30 for reasons which will be made more apparent below.

The sheet of material 10k is formed about the flower pot 30 (FIGS. 22 and 23) in a manner exactly like that described before in connection with the sheet of material 10 (FIGS. 1–4) except, in this instance, portions of the upper surface 20k having the pot connecting bonding materials 120 disposed thereon are positioned adjacent a portion of the outer peripheral surface 36 of the flower pot 30 whereby the pot connecting bonding materials 120 bondingly engage and bondingly connect portions of the sheet of material 10k to the outer peripheral surface 36 of the flower pot 30. The pot connecting bonding materials 120 are positioned on the sheet of material 10k and sized so that the pot connecting bonding materials 120 each extend generally between the upper end 32 and the lower end 30 of the flower pot 30 when the portions of the sheet of material 10k having the pot connecting bonding materials 120 disposed thereon are positioned adjacent the outer peripheral surface 36 of the flower pot 30.

Since the pot connecting bonding materials 120 are spaced a distance apart circumferentially about the sheet of material 10k, portions of the sheet of material 10k will be bondingly connected to the outer peripheral surface 42 of the flower pot 30 while other portions of the sheet of material 10k will not be connected to the outer peripheral surface 42 of the flower pot 30 (FIGS. 22 and 23). More particularly, when the sheet of material 10k is connected to the flower pot 30, portions of the sheet of material 10k will be connected to the outer peripheral surface 36 of the flower pot 30 at positions extending between the upper and the lower ends 32 and 34 of the flower pot 30 and extending a distance circumferentially about the flower pot 30 to form connected portions, while remaining portions of the sheet of material 10k extending between the upper and the lower ends 32 and 34 of the flower pot 30 will not be connected to the flower pot 30 forming unconnected portions 124 (the specific or individual connected portions 122 being designated by the reference numerals 122a, 122b, 122c, 122d, 122e and 122f in FIG. 23 and the specific or individual unconnected portions being designated in FIG. 23 by the specific reference numerals 124a, 124b, 124c, 124d, 124e and 124f). Each connected portion 122 extends a distance circumferentially about the flower pot 30 and extends generally between the upper and the lower ends 32 and 34 of the flower pot 30. Each unconnected portion 124 extends between the upper and the lower ends 32 and 34 of the flower pot 30 and each unconnected portion 124 extends a distance circumferentially about the flower pot 30. Each unconnected portion 124 is disposed generally between two adjacent connected portions 122.

The sheet of material 10k also could be constructed like the sheet of material 10a (FIGS. 5 and 6) or shaped to form an outwardly extending crimped portion like the crimped portion 46b (FIG. 7) or to include a drawstring like the drawstring 58 (FIGS. 8 and 9) or to include reinforcing means like the reinforcing means 86 (FIG. 12) or reinforcing means like the reinforcing means 98 (FIG. 14) or shrink material like the shrink material 102 (FIG. 16).

The sheet of material 10k has the sheet extension 25k connected thereto. The sheet extension 25k is constructed exactly like the sheet extension 25 shown in FIGS. 1 through 4 and described in detail before.

In use, the sheet extension 25k is formed about the floral grouping and the open upper end of the sheet extension 25k is closed via the contact between the bonding material 33k and adjacent portions of the sheet extension 25k in a manner like that described before.

EMBODIMENT OF FIG. 24

Shown in FIG. 24 is a flower pot 30l which is constructed exactly like the flower pot 30 described in detail before, except the flower pot 30l includes pot connecting bonding materials 126 (only two pot connecting bonding materials 126 being shown in FIG. 24 and designated therein by the individual reference numerals 126a and 126b). The pot connecting bonding materials 126 are spaced apart circumferentially about the outer peripheral surface pot 30l of the flower pot 30l and each of the pot connecting bonding materials 126 extends between the upper and the lower ends 32l and 34l of the flower pot 30l.

The flower pot 30l may be used in connection with the sheet of material 10k and the sheet extension 25k shown in FIG. 21 where the pot connecting bonding materials 120 on the sheet of material 10k are cohesive pot connecting bonding materials and the pot connecting bonding materials 126 on the flower pot 30l are cohesive pot connecting bonding materials. In this embodiment, the cohesive pot connecting bonding materials 120 on the sheet of material 10k cohesively bondingly engage and bondingly connect to the pot connecting bonding materials 126 on the flower pot 30l to form a decorative cover like that described before in connection with the decorative cover 50k (FIGS. 22 and 23).

The pot connecting bonding materials 126 also may be adhesive pot connecting bonding materials 126. In this instance, the flower pot 30l may be used in connection with a sheet of material like the sheet of material 10 shown in FIGS. 1–4 and described in detail before. In this embodiment, the sheet of material 10 (FIGS. 1–4) is formed about the flower pot 30l in the manner like that described before in connection with the sheet of material 10k (FIGS. 21–23) and the adhesive pot connecting bonding materials 126 bondingly engage and bondingly connect to portions of the sheet of material 10 (FIGS. 1–4) to form a decorative cover 50k (FIGS. 22 and 23).

The flower pot 30l also may be used in connection with any of the other sheets of material and sheet extensions described herein.

EMBODIMENT OF FIG. 25

Shown in FIG. 25 is a sheet of material 10h which is constructed exactly like the sheet of material 10d (FIG. 10), except the sheet of material 10m does not necessarily include the connecting bonding material like the connecting bonding material 24d shown in FIG. 10 in connection with the sheet of material 10d. In this embodiment, the sheet of material 10m is formed about the flower pot 30 in the manner exactly like that described before in connection with the sheet of material 10d (FIGS. 10 and 11), except a pot connecting bonding material 80m is positioned on the sheet of material 10m so that a portion of the sheet of material 10m near the upper end 32 of the flower pot 30 is folded over and disposed adjacent a portion of the inner peripheral surface 42 of the flower pot 30 near the upper end of the flower pot 32. In this position, the pot connecting bonding material 80m is bondingly engaged with and bondingly connected to a portion of the inner peripheral surface 42 of the flower pot 30 near the upper end 32 thereof. The bonding engagement between the pot connecting bonding material 80m and the inner peripheral surface 42 of the flower pot 30 extends circumferentially about the flower pot 30.

The sheet of material 10m may be constructed like any of the other sheets of material described herein, except the pot bonding material 80m is positioned on the sheet of material 10h to bondingly engage and connect with a portion of the inner peripheral surface 42 of the flower pot 30.

The sheet of material 10m has the sheet extension 25m connected thereto. The sheet extension 25m may be constructed exactly like the sheet extension 25 shown in FIGS. 1 through 4 and described in detail before.

EMBODIMENT OF FIG. 26

Shown in FIG. 26 is a modified flower pot 30n which is constructed exactly like the flower pots 30 described herein, except the flower pot 30n includes a pot connecting bonding material 128 disposed on a portion of the inner peripheral surface 42n of the flower pot 30n near and adjacent the upper end 32n of the flower pot 30n. The pot connecting bonding material 128 extends circumferentially about the inner peripheral surface 42n of the flower pot 30n.

The flower pot 30n may be used in connection with a sheet of material and sheet extension constructed exactly like the sheet of material 10 and sheet extension 25 shown in FIGS. 1–4 and described in detail before, except the sheet of material 10 does not necessarily include the connecting bonding material like the connecting bonding material 24. In this embodiment, the sheet of material is formed about the flower pot 30n in a manner like that described before in connection with the sheet of material 10 (FIGS. 1–4), except a portion of the sheet of material 10 is folded over and adjacent a portion of the inner peripheral surface 42n of the flower pot 30n into bonding engagement with the pot connecting bonding material 128 for bondingly connecting the sheet of material to the flower pot 30n in a manner like that described before in connection with the sheet of material 10m (FIG. 25).

The pot connecting bonding material 128 as just described preferably is an adhesive pot connecting bonding material. The pot connecting bonding material 128 may be a cohesive pot connecting bonding material and, in this instance, the flower pot 30n would be used in connection with a sheet of material and sheet extension like the sheet of material 10m and sheet extension 25m (FIG. 25) except the pot connecting bonding material 80m would be a cohesive pot connecting bonding material 80m cohesively engaging and cohesively bonding with the cohesive pot connecting bonding material 128 on the flower pot 30n.

The flower pot 30n also may be used in connection with any of the other sheets of material or sheet extensions described herein, except portions of the sheet of materials would be bondingly connected to the flower pot by way of the pot connecting bonding material 128 and, in this instance, it is not necessary to form the crimped portion, although the crimped portion also could be formed if desired in any particular application.

EMBODIMENT OF FIGS. 27, 28 AND 29

Shown in FIGS. 27, 28 and 29 is another modified sheet of material 10p which is constructed exactly like the sheet of material 10 shown in FIGS. 1–4 and described in detail before, except the sheet of material 10p does not necessarily include the connecting bonding material like the connecting bonding material 24. Rather, the sheet of material 10p includes a drawstring in the form of a ribbon 132 having opposite ends 134 and 136 connected to a portion of the upper surface 20p of the sheet of material 10p. More particularly, a portion of the ribbon 132 between the opposite ends 134 and 136 is connected to the upper surface 20p of the sheet of material 10p while portions of the ribbon 132 near each of the ends 134 and 136 are unconnected from the sheet of material 10p. The portions of the ribbon 132 near the opposite ends 134 and 136 which are unconnected to the sheet of material 10p each extend a distance from the sheet of material 10p. The ribbon 132 may be connected to the sheet of material 10p in any suitable manner. As shown in FIG. 28, the ribbon 132 is connected to the sheet of material 10p by way of an adhesive connecting bonding material 138. The ribbon 132 may be connected between two sheets like described before in connection with the drawstring 58 shown in FIGS. 8 and 9.

The portion of the ribbon 132 connected to the sheet of material 10p extends a distance circumferentially about the sheet of material 10p. The portion of the ribbon 132 connected to the sheet of material 10p is spaced a distance 140 from the outer peripheral surface 26p of the sheet of material 10p.

The sheet of material 10p is formed about the flower pot with a portion of the sheet of material 10p extending above the upper end 32 of the flower pot 30. More particularly, the ribbon 132 is positioned on the sheet of material 10p so that, when the sheet of material 10p is formed about the flower pot 30, the ribbon 132 extends above the upper end 32 of the flower pot 30. In this positions the opposite ends of the ribbon 132 are cinched or drawn tight to gather the portions of the sheet of material 10p near and adjacent the ribbon 132 over the upper end 32 of the flower pot 30 to form a crimped portion like the crimped portions 46 described before. In this position, the ends 134 and 136 of the ribbon 132 are tied or otherwise secured to the secure the ribbon 132 in the drawn or pulled position. Then, a bow 142 may be secured to the decorative cover 50p (FIG. 29) by adhesively connecting the bow 142 to either a portion of the ribbon 132 or a portion of the outer peripheral surface of the decorative cover 50p.

The sheet of material 10p also may be constructed like any of the other sheets of materials described herein to bond two portions of the flower pot or to include connecting bonding materials for bondingly connecting adjacent portions of the sheet of material when the ribbon 132 is drawn tightly about the upper end of the flower pot for example.

The sheet of material 10p has a sheet extension 25p connected thereto. The sheet extension 25p has a ribbon 150 connected thereto by way of an adhesive bonding material 151 (FIG. 28). The ribbon 150 may be connected between two sheets like that described before in connection with the drawstring 57 shown in FIGS. 8 and 9. The portion of the ribbon 150 connected to the sheet extension 25p extends circumferentially about the sheet extension 25p. The portion of the ribbon 150 connected to the sheet extension 25p is spaced a distance from the outer peripheral edge 27p (FIG. 27).

The sheet extension 25p is formed about the floral grouping 47 (FIG. 29). The ribbon 150 is drawn or pulled and then tied into a bow 153 (FIG. 29) for closing the open upper end of the sheet extension 25p and securing the sheet extension 25p about the floral grouping 47 to form the protective covering.

EMBODIMENT OF FIG. 30

Shown in FIG. 30 is the flower pot 30 having the growing medium 45 disposed therein. The floral grouping 47 extends a distance above the upper end 32 of the flower pot 30 in the manner described before. In this embodiment, the sheet of material 10r is formed about the outer peripheral surface of the flower pot 30 and positioned so that a portion of the sheet of material 10r near the outer peripheral edge 26r extends a distance above the upper end 32 of the flower pot 30. A circularly shaped band 160 is disposed about the portion of the sheet of material 10r extending above the upper end 32 of the flower pot 30. The band 160 crimps a portion of the sheet of material and pulls a portion of the sheet of material inwardly above the upper end 32 of the flower pot 30 for securing the sheet of material 10r in the position extending about the outer peripheral surface 36 of the flower pot 30 to form the decorative cover.

The sheet extension 25r is connected to the sheet of material 10r. The sheet extension 25r is constructed exactly like the sheet extension 25 shown in FIGS. 1 through 4 and described in detail before or any of the other sheet extensions described herein. The sheet extension 25r is formed about the floral grouping 47 and a portion of the sheet extension 25r near the outer peripheral edge 27r is closed via the bonding material in a manner like that described before in connection with the sheet extension 25 shown in FIGS. 1 through 4.

It should be noted that the band 160 may be disposed about the sheet of material 10r and about the outer peripheral surface 36 of the flower pot 30 for securing the sheet of material 10r in the position extending about the outer peripheral surface 36 of the flower pot 30 to provide the decorative covering if desired in a particular application.

As described herein, the various sheets of material are formed about the flower pot by hand forming the sheets of material about the flower pot and by hand crimping the material to form the crimped portions. It is contemplated that the forming of the sheet of material about the flower pot and the crimping of the sheet of material may be accomplished automatically or semi-automatically by way of a machine. For example, a machine may include pivoting elements or fingers which are automatically pivoted to move the sheet of material about the flower pot and position a sheet of material as described herein. In this instance, the fingers may include a separate element for forming the crimped portion or the element for forming the crimped portion may be a separate device such as halves of a donut shaped device which are moved inwardly to form the crimped portion after the sheet of material has been formed about the flower pot. In lieu of fingers or elements, the sheet of material may be blown by way of air jets or the like around the flower pot and then a crimping device may be disposed adjacent portions of the sheet of material to form the crimped portions. In a like manner, the sheet extension may be formed about the floral grouping in an automatic or semi-automatic manner.

It also is contemplated that the crimped portion may be formed by a strivet or band which is automatically applied to the sheet of material after the sheet of material has been formed about the flower pot with the strivet or band being positioned above the upper end of the flower pot.

EMBODIMENT OF FIGS. 31, 32 AND 33

Shown in FIGS. 31 through 33 and designated therein by the general reference numeral 210 is a flower pot cover constructed in accordance with the present invention. The flower pot cover 210 comprises a base 212 and a skirt 214. A sheet extension 25s is connected to the base 212 or, more particularly, to the outer periphery 232 of the skirt 214. The sheet extension 25s is constructed exactly like the sheet extension 25 shown in FIGS. 1 through 4 and described in detail before.

In one preferred form, the flower pot cover 210 is formed by taking a sheet of material constructed like the other sheets of material 10 described and placing it between a male and a female mold. In this embodiment, the male mold is brought into mating engagement with the female mold thereby forming the flower pot cover 210. In this process, a plurality of overlapping folds 216 (FIGS. 31 and 32) are formed in the base 212. The overlapping folds 216 cooperate to maintain the structural integrity of the base 212 and cooperate to maintain the base 212 in the preformed shape. Apparatus and methods for forming a flower pot cover as just described are disclosed in detail in U.S. Pat. No. 4,773,182, titled "ARTICLE FORMING SYSTEM" issued Sep. 27, 1988 and assigned to the Assignee of the present invention and the disclosure of this patent hereby specifically is incorporated herein by reference.

The base 212 has an upper end 218, a lower end 220 and an outer peripheral surface 222 (FIG. 31–32). A pot opening 224 (FIG. 31 and 33) is formed through the upper end 218 of the base 212 providing access to a pot receiving space 226 (FIGS. 31 and 33). The pot receiving space 226 forms an inner peripheral surface 228 in the base 212. As shown in FIGS. 31 and 32, the base 212 is generally cylindrically shaped, although the base 212 could be any geometric shape as may be desired in a particular application.

In a preferred manner, the skirt 214 is formed integrally with the base 212. The skirt 214 is connected to the upper end 218 of the base 212 at a connection 230 (FIGS. 31 and 32) between the upper end 218 of the base 212 and the skirt 214. The skirt 214 extends a distance radially outwardly from the base 212 terminating with an outer periphery 232. The skirt 214 has an inner peripheral face 234 (FIGS. 31 and 33) and an outer peripheral surface 236 (FIGS. 32 and 33). In one form, shown in FIGS. 31 and 32, a plurality of folds 238 also are formed in the skirt 214 with most of the folds 238 extending radially outwardly from the upper end 218 of the base 212 toward the outer periphery 232 of the skirt 214.

The base 212 and the skirt 214 may be constructed of any suitable material that is capable of being formed into the flower pot cover 210. As mentioned before, the base 212 and the skirt 214 are constructed from a sheet of material and the sheet of material is constructed from any of the materials described before in connection with the sheet of material 10 for example.

A bonding material 240 (FIG. 31) is disposed on a portion of the inner peripheral surface 234 of the skirt 214. The bonding material 240 more particularly is disposed near the connection 230 between the skirt 214 and the upper end 218 of the base 212 (FIG. 31). The bonding material 240 covers an area extending from the connection 230 of the skirt 214 to the upper end 218 of the base 212 a distance radially outwardly to a line 242 (FIG. 31) spaced a distance radially outwardly from the connection 230. Although the bonding material 240 is shown in FIGS. 31 and 32 in the form of a continuous strip of the bonding material 240, the bonding material 240 may be in the form of spots or spaced apart strips or any other form desired in a particular application suitable for effecting the crimping described below.

As mentioned before, the bonding material 240 preferably is an adhesive or cohesive. More particularly, the bonding material 240 preferably is a cohesive. When the bonding material 240 is a cohesive, a plurality of the flower pot covers 210 may be stacked one on top of the other with the base 212 of an adjacent flower pot cover being disposed in the pot receiving space 226 of an adjacent flower pot cover 210. When the bonding material 240 is a cohesive, the bonding material 240 will not cause one flower pot cover 210 to be bonded to an adjacent flower pot cover 210 when the flower pot covers 210 are stacked in the manner just described.

The bonding material 240 may be applied to the sheet of material prior to forming the sheet of material into the flower pot cover 210 or the bonding material 240 may be applied during the forming of the sheet of material into the flower pot cover 210 or the bonding material 240 may be applied after the flower pot cover 210 has been formed.

As mentioned before, the flower pot cover 210 is adapted and configured to be used with a flower pot, a flower pot being shown in FIG. 33 and designated therein by the referenced numeral 244. As shown in FIG. 33, the flower pot 244 has an upper end 246, a lower end 248, an outer peripheral surface 250 with an opening 252 being formed through the upper end 246 of the flower pot 244 providing access to a plant or flower receiving space 254.

In use, the lower end 248 of the flower pot 244 is disposed through the pot opening 224 and into the pot receiving space 226 of the flower pot cover 210 to a position wherein the lower end 248 of the flower pot 244 is disposed near the lower end 220 of the flower pot cover 210 and the upper end 246 of the flower pot 244 is disposed near the upper end 218 of the flower pot cover 210.

After the flower pot 244 has been disposed in the pot receiving space 226, a crimped portion 256 (FIG. 33) is formed in the skirt 214 by bringing together adjacent portions of the skirt 214 about the bonding material 240 thereby causing the adjacent portions to be bonded together for forming the crimped portion 256. The crimping of the skirt 214 may be accomplished by hand or with a device or machine as may be desired in a particular application.

The crimped portion 256 extends a distance radially inwardly above the upper end 246 of the flower pot 244. The crimped portion 256 is disposed about adjacent the upper end 246 of the flower pot 244 and the crimped portion 256 engages a portion of the upper end 246 of the flower pot 244 for cooperating to maintain the flower pot cover 210 assembled around or connected to the flower pot 244.

The crimped portion 256 preferably extends circumferentially about the upper end 218 of the flower pot cover 210 and preferably circumferentially around the upper end 246 of the flower pot 244. In some applications, it may be desirable to form the crimped portion 256 only at certain positions spaced circumferentially about the upper end 218 of the base 212.

The flower pot cover 210 substantially encompasses the flower pot 244 when the flower pot 244 is disposed in the pot receiving space 226.

The sheet extension 25s is formed about the floral grouping 47 (FIG. 335. The sheet extension 25s is constructed exactly like the sheet extension 25 shown in FIGS. 1 through 4 and described in detail before. The open upper end of the sheet extension 25s is closed by contacting the bonding material 33s with adjacent portions of the sheet extension 25s in the manner described before. The sheet extension 25s substantially encompasses the floral grouping 47 and provides the protective covering in the manner described before.

EMBODIMENT OF FIGS. 34 AND 35

Shown in FIGS. 34 and 35 is a modified flower pot cover 210a which is constructed exactly like the flower pot cover 210 shown in FIGS. 31, 32 and 33 and described in detail before, except the flower pot cover 210a also includes a bonding material 258 disposed on the inner peripheral surface 228a of the base 212a near the upper end 218a of the base 212a in addition to the bonding material 240a disposed on the inner peripheral surface 234a of the skirt 214a.

The bonding material 258 extends from the upper end 218a of the base 212a a distance toward the lower end 220 of the base 212 to a line 260 disposed near and spaced a distance from the upper end 218a of the base 212a (FIG. 34). The bonding material 258 extends circumferentially about the upper end 218a of the base 212a (FIG. 34). The bonding material 258 substantially covers the entire area between the upper end 218a of the base 212a and the line 260. It should be noted that the bonding material 258, although shown as a continuous strip in FIG. 34, could be spots or spaced apart strips if desired in a particular application.

In operation, as illustrated in FIG. 35, the flower pot cover 210a is disposed about the flower pot 244 in the manner described before in connection with the flower pot 210 shown in FIGS. 31, 32 and 33, and the crimped portion 256a is formed in the flower pot cover 210a in a manner exactly like that described before in connection with the flower pot cover 210 and the crimped portion 256 shown in FIG. 33. In addition, the bonding material 258 on the inner peripheral surface 228a of the base 212a bondingly engages to a portion of the outer peripheral surface 250 of the flower pot 244 near the upper end 246 of the flower pot 244. The bonding engagement between the bonding material 258 and the flower pot 244 further cooperates to secure the flower pot cover 210a to the flower pot 244.

In those instances where the bonding material 258 is a cohesive, a cohesive material also is included on the outer peripheral surface 250 of the flower pot 244 for bondingly engaging with the bonding material 258 on the flower pot cover 210a.

A sheet extension 25t is connected to the flower pot cover 210a. The sheet extension 25t is constructed exactly like the sheet extension 25s shown in FIGS. 31 through 33 and described in detail before. The sheet extension 25t is formed about the floral grouping to provide the protective covering in the manner described before.

EMBODIMENT OF FIG. 36 AND FIG. 37

Shown in FIGS. 36 and 37 is another modified flower pot cover 210b which is constructed exactly like the flower pot cover 210 shown in FIGS. 31 and 32, except the flower pot cover 210b does not include bonding material on the skirt 214b like the bonding material 240 on the skirt 214 shown in FIGS. 31 and 32. Rather, the flower pot cover 210b includes bonding material 262 disposed on the inner peripheral surface 228b of the flower pot cover 210b near the upper end 218b of the base 212b (FIG. 36). The bonding material 262 extends circumferentially about the upper end 218b of the base 212b. The bonding material 262 extends from the upper end 218b to a line 264 spaced a distance from the upper end 218b of the base 212b. The bonding material 262 substantially covers the entire area between the upper end 218b and the lines 264. The bonding material 262 could be in the form of spots or spaced apart strips if desired in a particular application.

In use, the flower pot 244 is disposed in the pot receiving space 226b of the flower pot cover 210b, as shown in FIG. 37. The crimped portion 256b is formed in the flower pot cover 210b by crimping together portions of the flower pot cover 210b near the bonding material 262 with the bonding material 262 cooperating to bond the overlapping crimped portions for maintaining the shape of the crimped portion 256b in a manner like that described before. In this application, the crimped portion 256b is formed in the base 212b, rather than in the skirt 214b as is the case in connection with the flower pot cover 210 shown in FIGS. 31, 32 and 33.

The flower pot cover 210b includes the sheet extension 25u. The sheet extension 25u is constructed exactly like the sheet extension 25s shown in FIGS. 31 through 33 and described in detail before. The sheet extension 25u is formed about the floral grouping in the manner described before to provide the protective covering.

EMBODIMENT OF FIG. 38

Shown in FIG. 38 is another modified flower pot cover 210c which is constructed exactly like the flower pot cover 210 shown in FIGS. 31 and 32 and described in detail before, except the flower pot cover 210c does not include the bonding material 240 on the base 212. Rather, the flower pot cover 210c includes bonding material 266 on the outer peripheral surface 236c of the skirt 214c. The bonding material 266 extends circumferentially around the the connection 230c of the skirt 214c to connection 230c. The bonding material 266 extends from the upper end 218c of the base 212c to a line 268 spaced a distance from the upper end 218c of the base 212c toward the upper periphery 232c of the skirt 214c.

In use, the flower pot cover 210c is disposed about a flower pot 244 and the crimped portion is formed by crimping together portions of the flower pot cover near and adjacent the bonding material 266 to form the crimped portion in a manner like that described before in connection with the flower pot cover 210b shown in FIG. 31, except the bonding material 240 is on the inner peripheral surface 234 of the skirt 214, rather than the outer peripheral surface 236c as is the case with the flower pot cover 210c shown in FIG. 37.

The flower pot cover 10c includes the sheet extension 25w. The sheet extension 25w is constructed exactly like the sheet extension 25s shown in FIGS. 1 through 3 and described in detail before. The sheet extension 25w is formed about the floral grouping to provide the protective covering in the manner described before and has bonding material 33w for closing the sheet extension 25w.

EMBODIMENT OF FIG. 39

Shown in FIG. 39 is a flower pot cover 210d which is constructed exactly like the flower pot cover 210c shown in FIG. 38 described in detail before, except the flower pot cover 210d also includes bonding material 270 on the outer peripheral surface of the base 212d near the connection 230d. In this instance, the crimped portion is formed by crimping together portions of the base 212d and the skirt 214d having the bonding materials 270 and 266 respectively thereon.

The flower pot cover 210d includes the sheet extension 25x. The sheet extension 25x is constructed exactly like the sheet extension 25s shown in FIGS. 31 through 33 and described in detail before. The sheet extension 25x is formed about the floral grouping to provide the protective covering in the manner described before and has a bonding material 33x for closing the sheet extension 25x.

EMBODIMENT OF FIG. 40

Shown in FIG. 40 is another modified flower pot cover 210e which is constructed exactly like the flower pot cover 210d, except the flower pot cover 210e does not include the bonding material 266 on the skirt. Rather, the flower pot cover 210e includes only a bonding material 274 on the base 212e which extends to a line 276. The flower pot cover 210e will operate to form the crimped portion in a manner exactly like that described before with respect to the flower pot covers 210c and 210d shown in FIGS. 38 and 39, except the crimped portion only will be formed by crimping together portions of the bonding material 274 on the base 212e.

The flower pot cover 10e includes the sheet extension 25y. The sheet extension 25y is constructed exactly like the sheet extension 25s shown in FIGS. 31 through 33 and described in detail before. The sheet extension 25y is formed about the floral grouping to provide the protective covering in the manner described before and has a bonding material 33y for closing the sheet extension 25y.

The sheet extensions 25s, 25t, 25u, 25w, 25x and 25y may be constructed like any of the other sheet extensions described herein as may be desired in a particular application.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. A method for providing a decorative covering and a protective covering comprising:
    providing a sheet of material having an upper surface, a lower surface and an outer peripheral edge, a sheet extension being connected to the sheet of material and the sheet extension extending a distance outwardly from the sheet of material and the sheet of material having detaching means for detaching the sheet extension from the sheet of material;
    providing a flower pot having an upper end, a lower end, an outer peripheral surface and an opening extending through the upper end of the flower pot providing access to a retaining space with the flower pot having an inner peripheral surface encompassing a substantial portion of the retaining space and the flower pot having a bottom formed near the lower end of the flower pot, the flower pot having a floral grouping disposed in the retaining space and extending a distance upwardly beyond the upper end of the flower pot;
    forming the sheet of material about the flower pot to a position wherein the sheet of material extends about a substantial portion of the outer peripheral surface of the flower pot to provide the decorative covering and forming the sheet extension about the floral grouping to a position wherein the sheet extension covers a substantial portion of the floral grouping to provide the protective covering; and placing a band about a portion of the sheet of material extending about or above the flower pot in a position below the detaching means with the band engaging the portion of the sheet of material extending about or above the flower pot, the band forming a crimped portion in a portion of the sheet of material with the crimped portion cooperating to hold the sheet of material in the form of the decorative covering extending about the flower pot with the sheet extension extending about the floral grouping.

2. The method of claim 1 wherein the detaching means comprises perforations and the method comprises the additional step of:
    tearing along the line of perforations to separate the protective covering formed by the sheet extension from the decorative covering formed by the sheet of material.

3. The method of claim 1 wherein the step of providing the sheet of material with the sheet extension connected thereto further comprising providing the sheet of material with the sheet extension connected thereto and with the sheet extension extending about substantially the entire outer peripheral edge of the sheet of material, the sheet extension extending the distance outwardly from the outer peripheral edge of the sheet of material terminating with an outer peripheral edge of the sheet extension, the sheet extension having an upper surface and a lower surface, the upper surface of the sheet extension being disposed in a plane about coplanar with the upper surface of the sheet of material and the lower surface of the sheet extension being disposed in a plane about coplanar with the lower surface of the sheet of material.

4. The method of claim 1 wherein the method further comprises:
    closing the open upper end of the protective covering.

5. The method of claim 4 wherein the step of providing the sheet of material with the sheet extension connected thereto further comprises the sheet of material with the sheet extension connected thereto and with the sheet extension having a connecting bonding material disposed thereon, and wherein the step of closing the open upper end of the protective covering further comprises:
    bringing portions of the sheet extension having the connecting bonding material thereon into bonding engagement with adjacent portions of the sheet extension for bondingly connecting the adjacent portions of the sheet extension and closing the open upper end of the protective covering.

6. The method of claim 4 wherein the step of providing the sheet of material with the sheet extension connected thereto further comprises providing the sheet of material with the sheet extension connected thereto and with a drawstring connected to the sheet extension, and wherein the step of closing the open upper end of the protective covering further comprises:
    pulling the drawstring on the sheet extension to close the open upper end of the protective covering.

7. The method of claim 4 wherein the step of providing the sheet of material with the sheet extension connected thereto further comprises providing the sheet of material with the sheet extension connected thereto and with reinforcing means being connected to the sheet extension, and wherein the step of closing the open upper end of the protective covering further comprises:

crimping the portion of the sheet extension with the reinforcing means disposed therein together to close the open upper end of the protective covering.

8. The method of claim 4 wherein the step of providing the sheet of material with the sheet extension connected thereto further comprises providing the sheet of material with the sheet extension connected thereto and with a ribbon connected to the sheet extension, and wherein the step of closing the open upper end of the protective covering further comprises:

pulling the ribbon on the sheet extension to close the open upper end of the protective covering.

9. The method of claim 1 wherein the step of. forming the crimped portion is defined further as forming the crimped portion in the sheet of material with the crimped portion extending a distance radially inwardly toward a central portion of the flower pot forming a ridge portion.

10. The method of claim 1 wherein during the step of forming the crimped portion a portion of the sheet of material is caused to form a ridge portion.

11. The method of claim 1 wherein the step of forming the crimped portion is defined further as forming the crimped portion in the sheet of material with the crimped portion extending a distance radially inwardly toward a central portion of the flower pot forming a ridge portion, the crimped portion extending circumferentially about the upper end of the flower pot and the ridge portion extending circumferentially about the upper end of the flower pot.

12. The method of claim 1 wherein during the step of forming the crimped portion a portion of the sheet of material is caused to form a ridge portion, the crimped portion extending circumferentially about the upper end of the flower pot and the ridge portion extending circumferentially about the upper end of the flower pot.

13. The method of claim 1 wherein the step of forming the crimped portion is defined further as forming a plurality of overlapping folds in a portion of the portion of the sheet extending above the upper end of the flower pot with the overlapping folds cooperating to form the crimped portion.

14. The method of claim 13 wherein the step of forming the overlapping folds is defined further as forming the overlapping folds with a portion of the sheet of material having the overlapping folds therein extending circumferentially about the upper end of the flower pot.

* * * * *

UNITED STATES PATENT AND TRADEMARK OFFICE
CERTIFICATE OF CORRECTION

PATENT NO.    : 5,991,999
DATED         : November 30, 1999
INVENTOR(S)   : Donald E. Weder It is certified that error appears in the above-identified patent and that said Letters Patent is hereby corrected as shown below:

The title page, showing the illustrative figure should be deleted to be replaced with the attached title page.

Column 4,
Line 34, Delete the word "have".

Column 5,
Line 56, Place a -- , -- between the words, flower plant.

Column 7,
Line 53, Delete the word "surface 27" and substitute therefore the word -- edge 27 --.

Column 8,
Lines 18 through 21, Delete the Italics on, "Preferably, the distance 56 corresponds or equals the distance 29 described before in connection with the sheet of material shown in FIG.1".

Column 9,
Line 3, Delete the word "and" and substitute therefore the word -- of --.
Line 65, Delete "—a"

Column 12,
Line 45, Delete the word "FIGS" and substitute therefore the word --FIG. --.

Column 13,
Line 39, Delete the letter "X".

Column 16,
Line 45, Delete the numeral "30" first occurrence and substitute therefore the numeral -- 34 --.

Column 17,
Line 40, Delete the numeral"30I" and substitute therefore the numeral -- 36I --.

Column 18,
Line 6, Delete the numeral "10h" and substitute therefore the numeral -- 10m --.
Line 19, Delete "the upper end of the flower pot 32" and substitute therefore -- the upper end 32 of the flower pot 30. --.

UNITED STATES PATENT AND TRADEMARK OFFICE
CERTIFICATE OF CORRECTION

PATENT NO.     : 5,991,999
DATED          : November 30, 1999
INVENTOR(S)    : Donald E. Weder It is certified that error appears in the above-identified patent and that said Letters Patent is hereby corrected as shown below:

Column 19,
Line 59, Delete the word "the" first occurrence.

Column 23,
Line 10, Delete the word FIG. 335" and substitute therefore -- Fig. 33 --.

Column 24,
Line 45, Delete "212ctoward" and substitute therefore -- 212 toward --.
Line 59, Delete "FIGS 1 through 3" and substitute therefore -- FIG. 32 --.

United States Patent [19]

Weder

[11] Patent Number: 5,991,999
[45] Date of Patent: *Nov. 30, 1999

[54] METHOD OF COVERING FOR FLOWER POT AND FLORAL GROUPING

[75] Inventor: Donald E. Weder, Highland, Ill.

[73] Assignee: Southpac Trust International, Inc.

[*] Notice: This patent is subject to a terminal disclaimer.

[21] Appl. No.: 08/818,619

[22] Filed: Mar. 14, 1997

Related U.S. Application Data

[63] Continuation of application No. 08/468,112, Jun. 6, 1995, Pat. No. 5,625,936, which is a continuation of application No. 08/037,067, Mar. 25, 1993, Pat. No. 5,542,169, which is a continuation-in-part of application No. 07/926,098, Aug. 5, 1992, Pat. No. 5,809,629.

[51] Int. Cl.$^6$ .................................................. B21D 35/00
[52] U.S. Cl. ...................... 29/469.5; 29/515; 53/399; 53/464; 47/66.7; 47/72
[58] Field of Search ................................. 29/469.5, 505, 29/515; 53/397, 399, 410, 412, 464; 47/66.7, 72; 206/423

[56] References Cited

U.S. PATENT DOCUMENTS

| | | |
|---|---|---|
| 1,446,563 | 2/1923 | Hughes . |
| 1,610,652 | 12/1926 | Bouchard . |
| 1,868,853 | 7/1932 | Sievers . |
| 1,988,886 | 1/1935 | Wilson .................................. 47/37 |
| 2,152,648 | 4/1939 | Jones .................................... 47/34 |
| 2,209,778 | 7/1940 | Krasowski ........................... 41/10 |
| 2,302,259 | 11/1942 | Rothfuss ............................. 41/10 |
| 2,621,142 | 12/1952 | Wetherell ........................ 154/117 |
| 2,648,487 | 8/1953 | Linda ................................. 229/55 |
| 2,774,187 | 12/1956 | Smithers ............................. 47/41 |

(List continued on next page.)

FOREIGN PATENT DOCUMENTS

| | | |
|---|---|---|
| 4231978 | 6/1979 | Australia . |
| 2036163 | 12/1970 | France . |
| 2619698 | 3/1989 | France . |
| 345464 | 12/1921 | Germany . |
| 513971 | 11/1930 | Germany . |
| 8905250 | 10/1989 | Germany . |
| 560532 | 4/1975 | Switzerland . |
| 1204647 | 9/1970 | United Kingdom . |
| 2074542 | 11/1981 | United Kingdom . |
| 9315979 | 8/1993 | WIPO . |

OTHER PUBLICATIONS

Ex. A — Color Them Happy With Highlander® Products, ©1992, 2 pages.
Ex. B — Super Seller, Supermarket Floral, Sep. 15, 1992.
Ex. C — Costa Keeps the Christmas Spirit, Supermarket Floral, Sep. 15, 1992.
Ex. D — Now, More Than Ever, Supermarket Floral, Sep. 15, 1992.
Ex. E — Halloween, Link Magazine, Sep. 1992, 2 pages.
Ex. F — Speed Cover® Brochure — The Simple Solution . . . , ©1989.
Ex. G — Speed Sheets and Speed Rolls Brochure, ©1990.

*Primary Examiner*—David P. Bryant
*Attorney, Agent, or Firm*—Dunlap, Codding & Rogers, P.C.

[57] ABSTRACT

A covering for a flower pot with a floral grouping disposed therein and extending a distance above an upper end of the flower pot wherein the flower pot has a lower end and an outer peripheral surface. The covering includes a sheet of material having an upper surface, a lower surface and an outer peripheral edge with a sheet extension connected to the outer peripheral edge of the sheet of material and extending a distance from the outer peripheral edge of the sheet of material. The sheet of material is formed about the flower pot to a position wherein the sheet of material extends about substantially the entire outer peripheral surface of the flower pot to provide a decorative covering and the sheet extension is formed about the floral grouping to a position wherein the sheet extension extends about a substantial portion of the floral grouping to provide a protective covering.

14 Claims, 8 Drawing Sheets

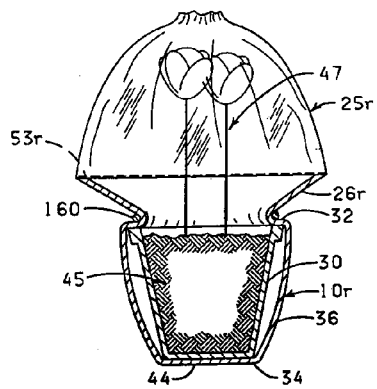

UNITED STATES PATENT AND TRADEMARK OFFICE
CERTIFICATE OF CORRECTION

PATENT NO.    : 5,991,999                                            Page 4 of 29
DATED         : November 30, 1999
INVENTOR(S)   : Donald E. Weder It is certified that error appears in the above-identified patent and that said Letters Patent is hereby corrected as shown below:

Drawings,
Delete Figs. 1-40 and each associated lead line, as shown in the following drawings.

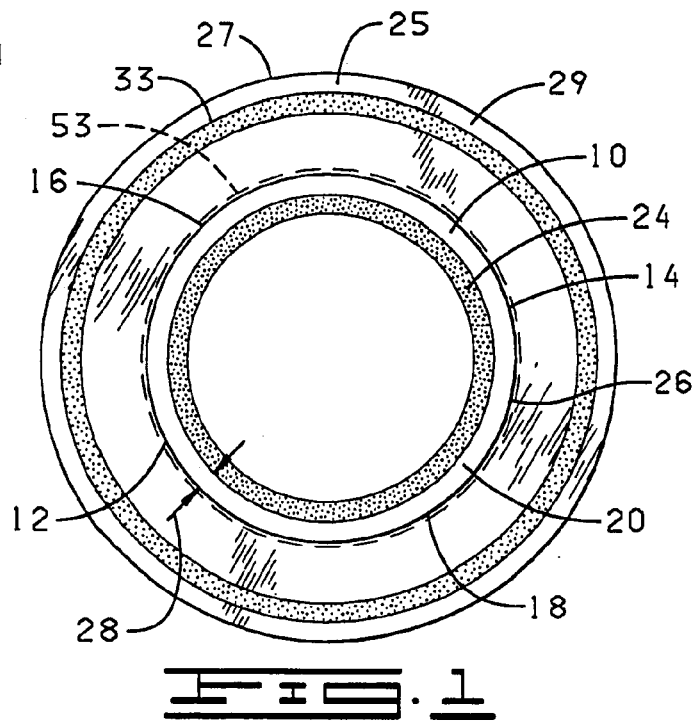

UNITED STATES PATENT AND TRADEMARK OFFICE
CERTIFICATE OF CORRECTION

PATENT NO. : 5,991,999
DATED : November 30, 1999
INVENTOR(S) : Donald E. Weder

It is certified that error appears in the above-identified patent and that said Letters Patent is hereby corrected as shown below:

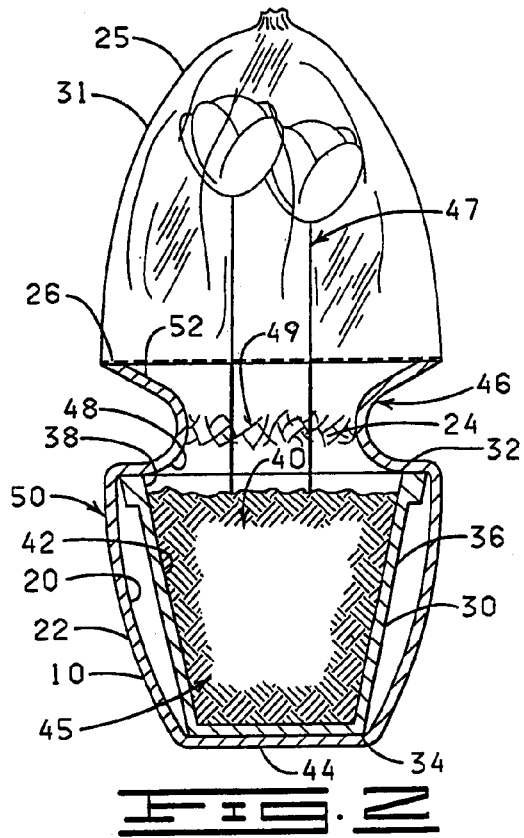

Fig. 2

UNITED STATES PATENT AND TRADEMARK OFFICE
CERTIFICATE OF CORRECTION

PATENT NO. : 5,991,999
DATED : November 30, 1999
INVENTOR(S) : Donald E. Weder

It is certified that error appears in the above-identified patent and that said Letters Patent is hereby corrected as shown below:

Fig. 3

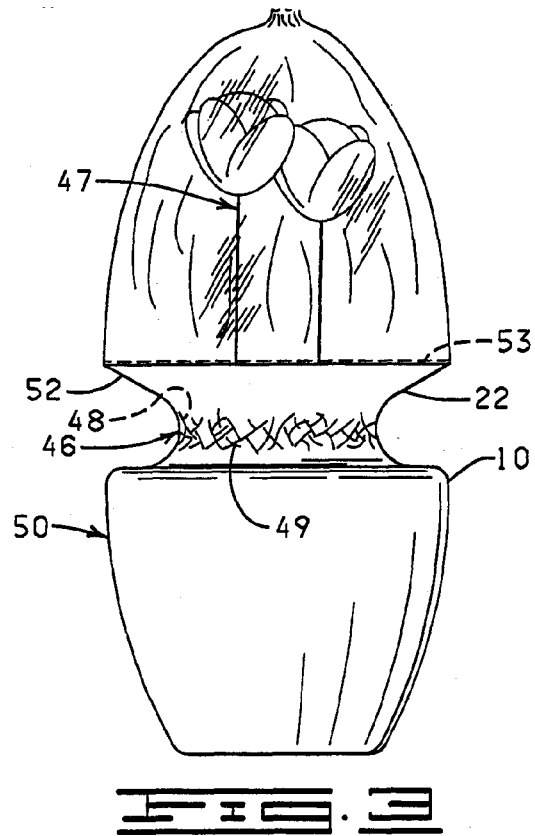

Fig. 4

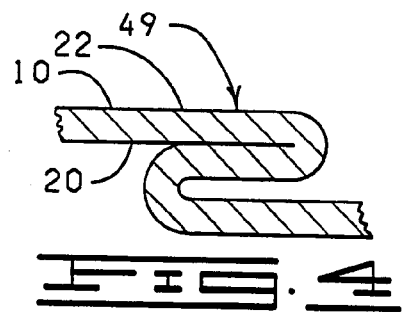

UNITED STATES PATENT AND TRADEMARK OFFICE
CERTIFICATE OF CORRECTION

PATENT NO. : 5,991,999
DATED : November 30, 1999
INVENTOR(S) : Donald E. Weder

It is certified that error appears in the above-identified patent and that said Letters Patent is hereby corrected as shown below:

Fig. 5

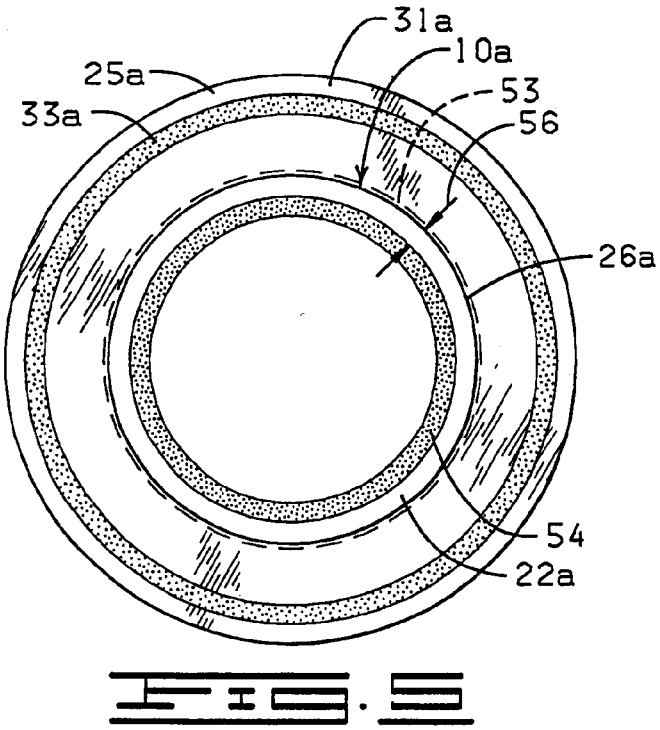

Fig. 6

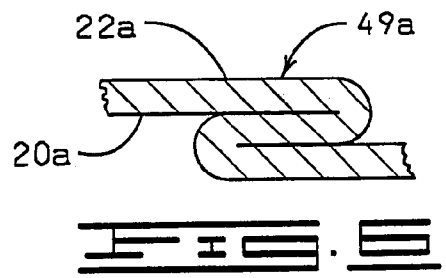

UNITED STATES PATENT AND TRADEMARK OFFICE
CERTIFICATE OF CORRECTION

PATENT NO. : 5,991,999
DATED : November 30, 1999
INVENTOR(S) : Donald E. Weder

It is certified that error appears in the above-identified patent and that said Letters Patent is hereby corrected as shown below:

Fig. 7

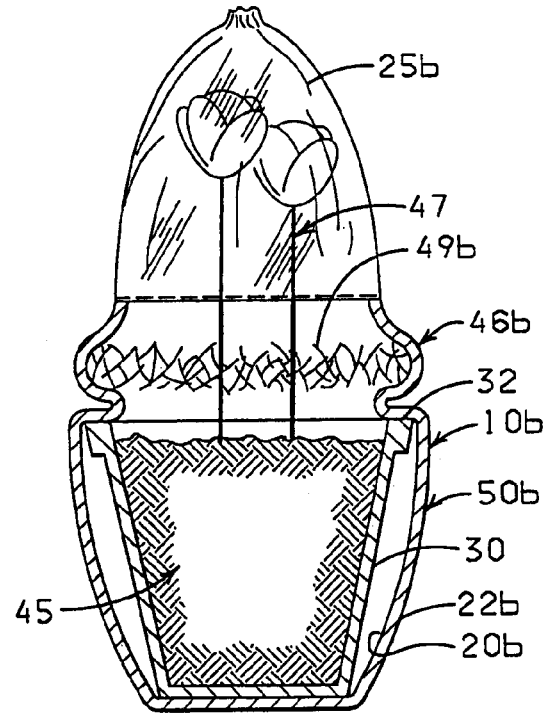

UNITED STATES PATENT AND TRADEMARK OFFICE
CERTIFICATE OF CORRECTION

PATENT NO. : 5,991,999
DATED : November 30, 1999
INVENTOR(S) : Donald E. Weder

It is certified that error appears in the above-identified patent and that said Letters Patent is hereby corrected as shown below:

Fig. 8

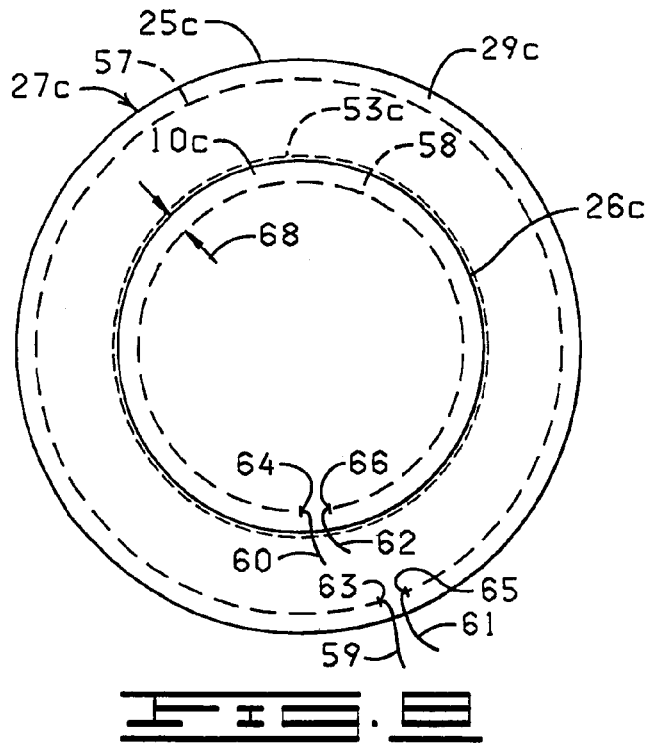

Fig. 9

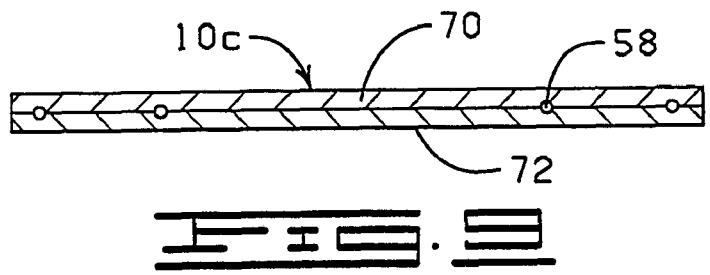

UNITED STATES PATENT AND TRADEMARK OFFICE
CERTIFICATE OF CORRECTION

PATENT NO. : 5,991,999
DATED : November 30, 1999
INVENTOR(S) : Donald E. Weder

It is certified that error appears in the above-identified patent and that said Letters Patent is hereby corrected as shown below:

Fig. 10

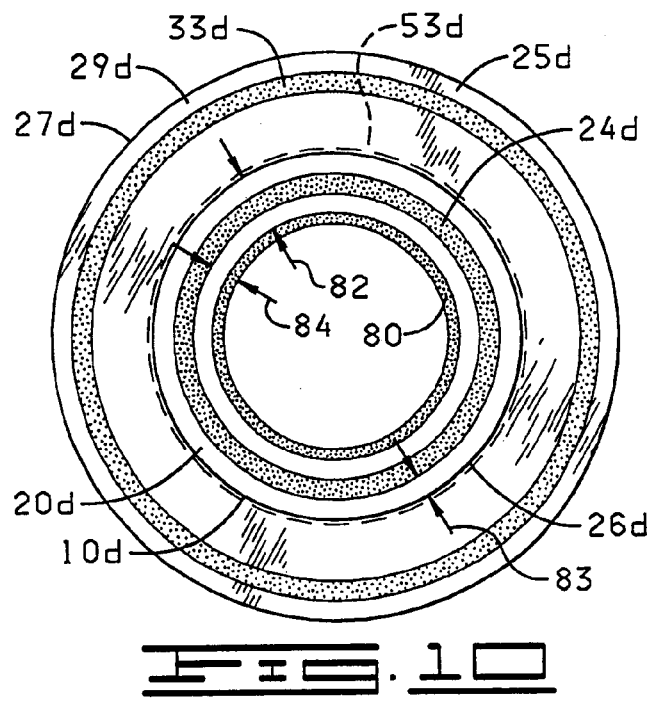

UNITED STATES PATENT AND TRADEMARK OFFICE
CERTIFICATE OF CORRECTION

PATENT NO. : 5,991,999
DATED : November 30, 1999
INVENTOR(S) : Donald E. Weder

It is certified that error appears in the above-identified patent and that said Letters Patent is hereby corrected as shown below:

Fig. 11

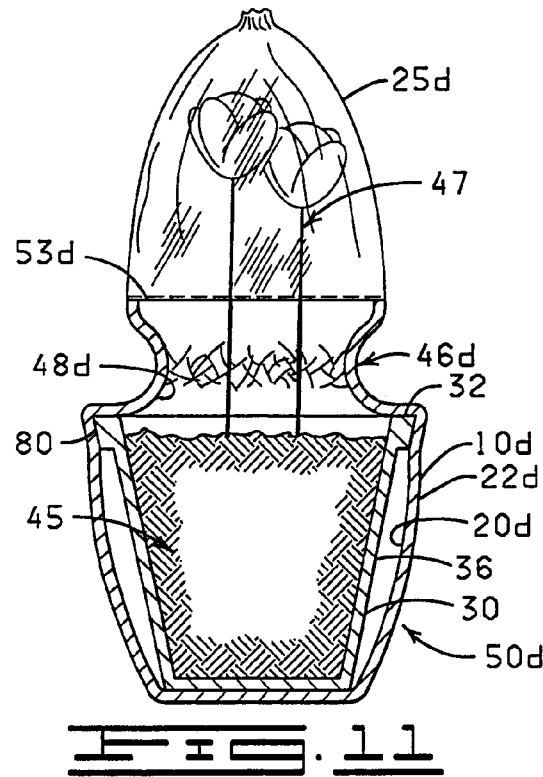

UNITED STATES PATENT AND TRADEMARK OFFICE
CERTIFICATE OF CORRECTION

PATENT NO. : 5,991,999
DATED : November 30, 1999
INVENTOR(S) : Donald E. Weder

It is certified that error appears in the above-identified patent and that said Letters Patent is hereby corrected as shown below:

Fig. 12

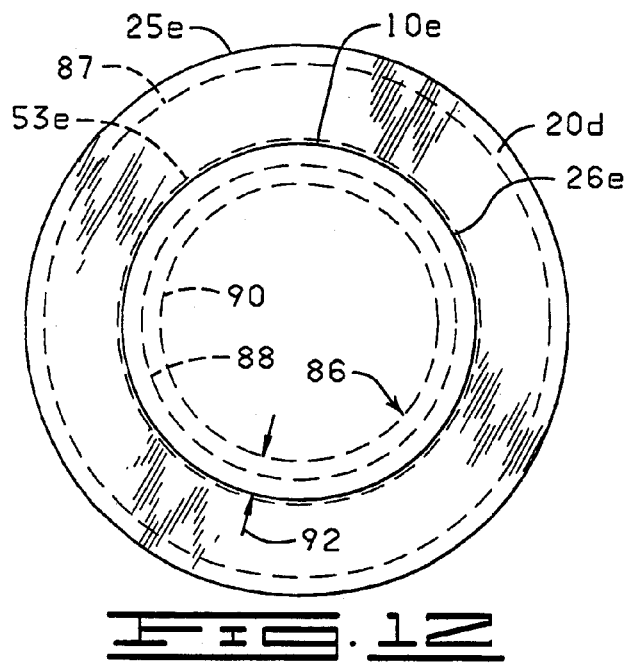

Fig. 13

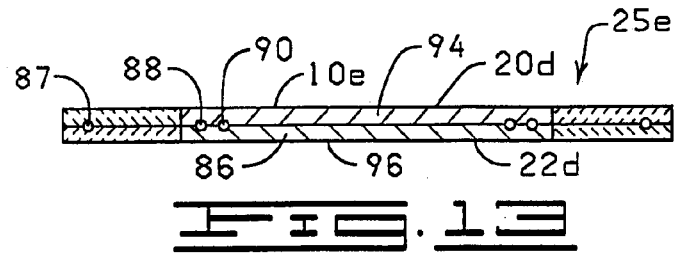

UNITED STATES PATENT AND TRADEMARK OFFICE
CERTIFICATE OF CORRECTION

PATENT NO.    : 5,991,999
DATED         : November 30, 1999
INVENTOR(S)   : Donald E. Weder Page 13 of 29

It is certified that error appears in the above-identified patent and that said Letters Patent is hereby corrected as shown below:

Fig 14

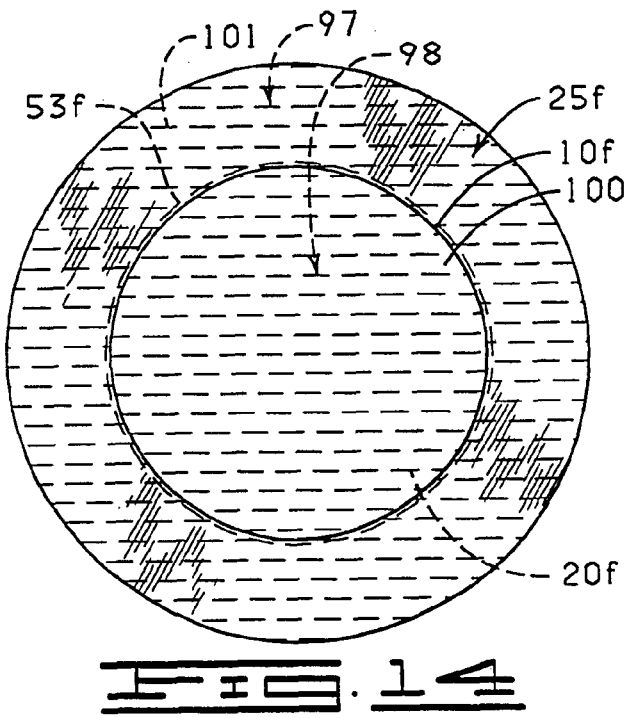

Fig. 15

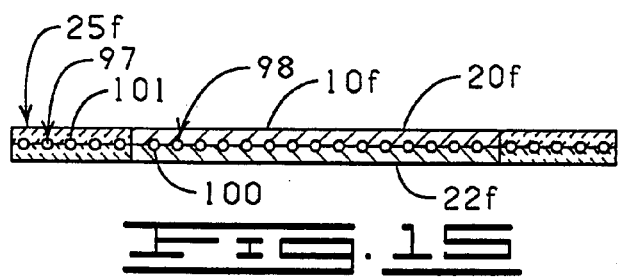

UNITED STATES PATENT AND TRADEMARK OFFICE
CERTIFICATE OF CORRECTION

PATENT NO. : 5,991,999
DATED : November 30, 1999
INVENTOR(S) : Donald E. Weder

It is certified that error appears in the above-identified patent and that said Letters Patent is hereby corrected as shown below:

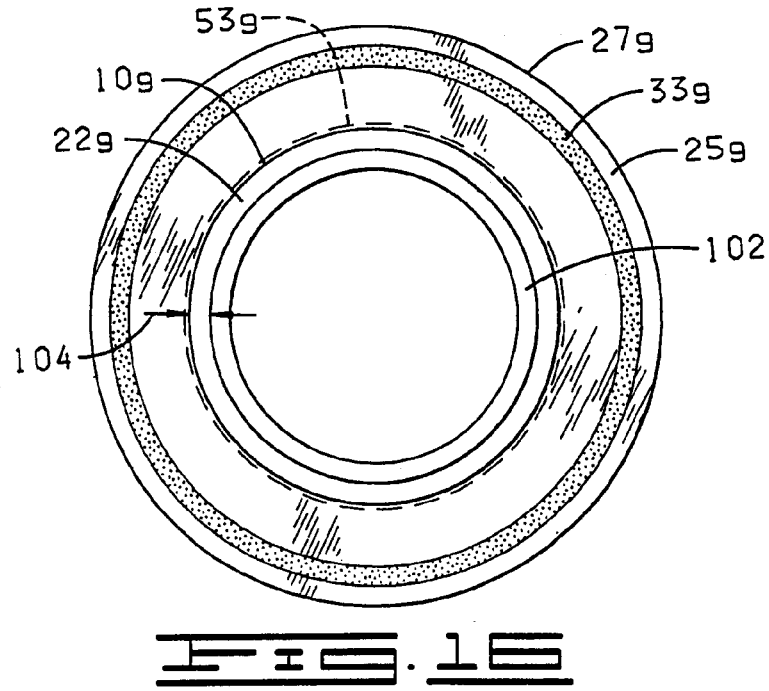

Fig. 16

UNITED STATES PATENT AND TRADEMARK OFFICE
CERTIFICATE OF CORRECTION

PATENT NO. : 5,991,999
DATED : November 30, 1999
INVENTOR(S) : Donald E. Weder

It is certified that error appears in the above-identified patent and that said Letters Patent is hereby corrected as shown below:

Fig. 17

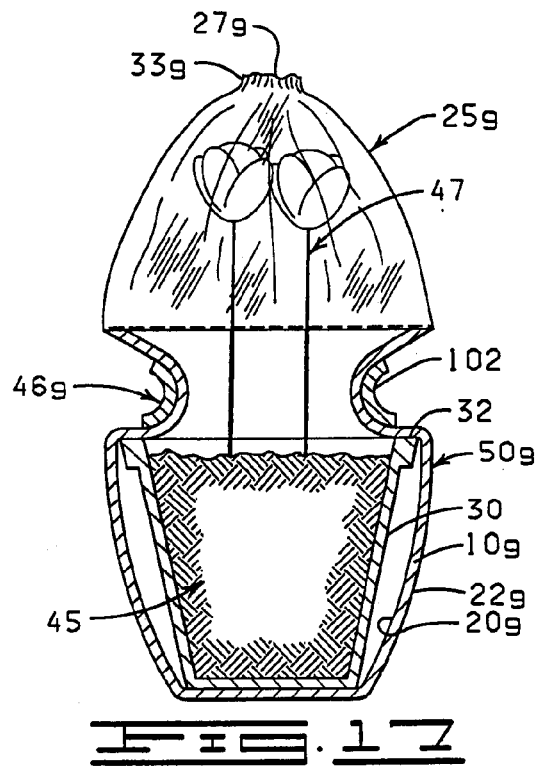

Fig. 18

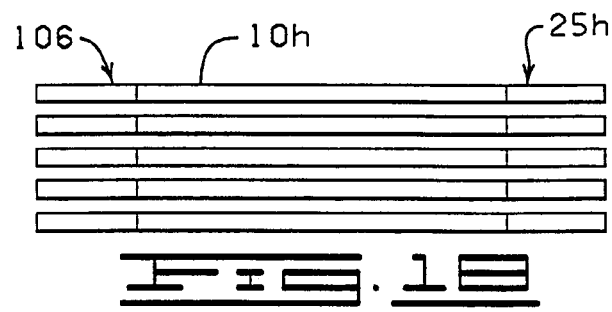

UNITED STATES PATENT AND TRADEMARK OFFICE
CERTIFICATE OF CORRECTION

PATENT NO.   : 5,991,999
DATED        : November 30, 1999
INVENTOR(S)  : Donald E. Weder It is certified that error appears in the above-identified patent and that said Letters Patent is hereby corrected as shown below:

Fig. 19

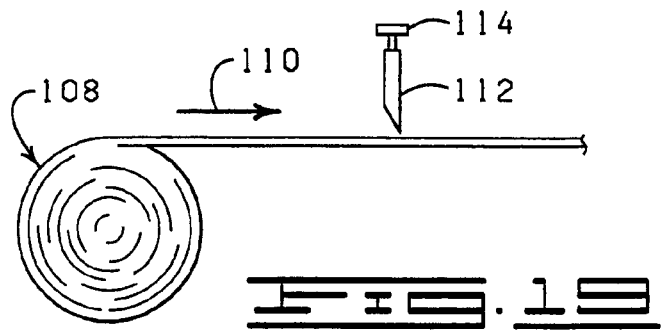

Fig. 20

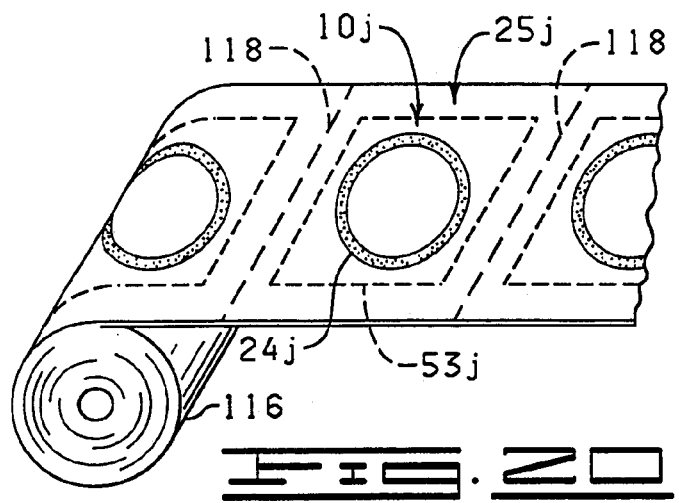

UNITED STATES PATENT AND TRADEMARK OFFICE
CERTIFICATE OF CORRECTION

PATENT NO.   : 5,991,999
DATED        : November 30, 1999
INVENTOR(S)  : Donald E. Weder It is certified that error appears in the above-identified patent and that said Letters Patent is hereby corrected as shown below:

Fig. 21

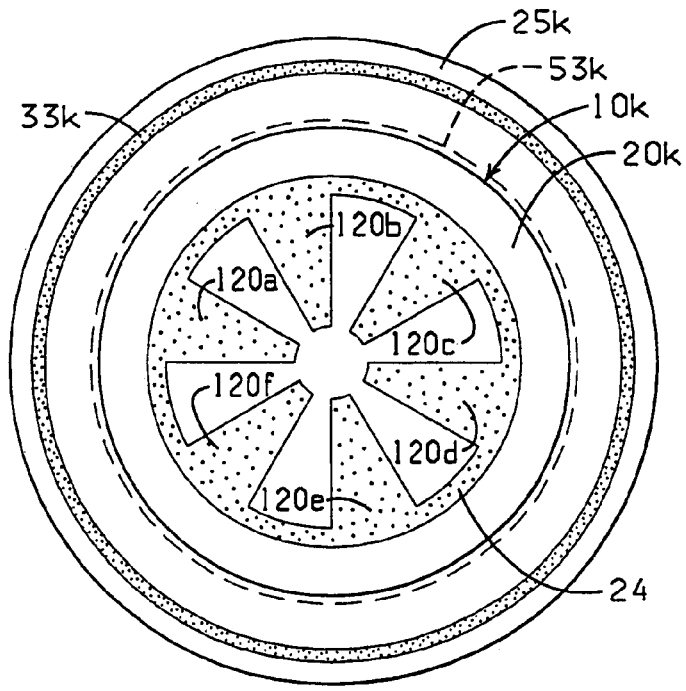

Fig. 21

UNITED STATES PATENT AND TRADEMARK OFFICE
CERTIFICATE OF CORRECTION

PATENT NO. : 5,991,999
DATED : November 30, 1999
INVENTOR(S) : Donald E. Weder

It is certified that error appears in the above-identified patent and that said Letters Patent is hereby corrected as shown below:

Fig. 22

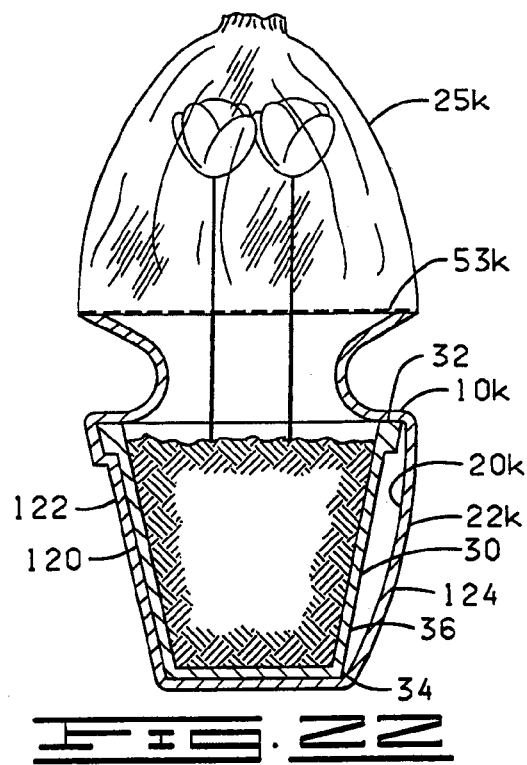

UNITED STATES PATENT AND TRADEMARK OFFICE
CERTIFICATE OF CORRECTION

PATENT NO. : 5,991,999
DATED : November 30, 1999
INVENTOR(S) : Donald E. Weder

It is certified that error appears in the above-identified patent and that said Letters Patent is hereby corrected as shown below:

Fig. 23

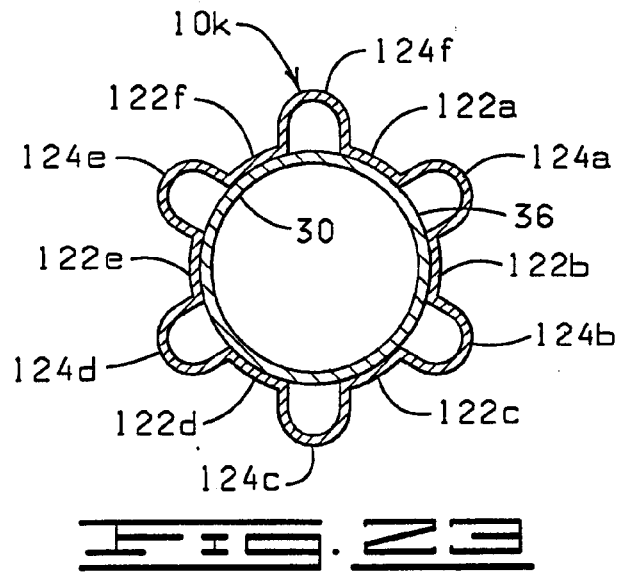

Fig. 24

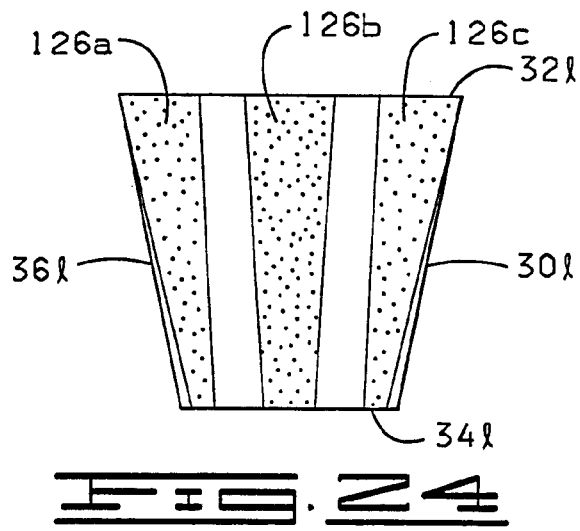

UNITED STATES PATENT AND TRADEMARK OFFICE
CERTIFICATE OF CORRECTION

PATENT NO. : 5,991,999
DATED : November 30, 1999
INVENTOR(S) : Donald E. Weder

It is certified that error appears in the above-identified patent and that said Letters Patent is hereby corrected as shown below:

Fig. 25

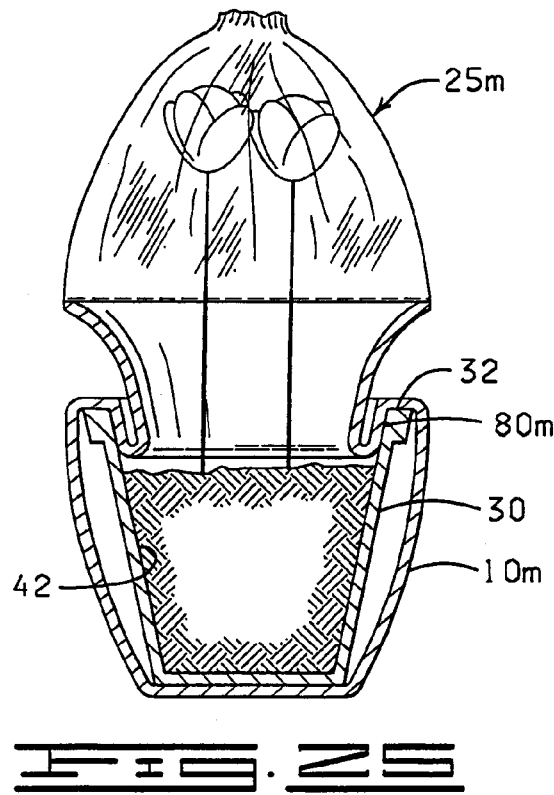

Fig. 26

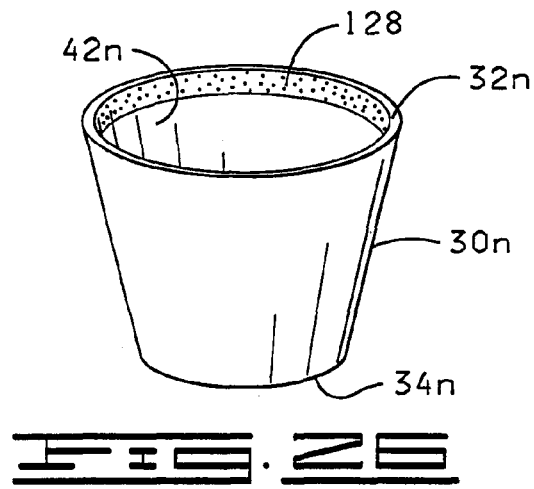

UNITED STATES PATENT AND TRADEMARK OFFICE
CERTIFICATE OF CORRECTION

PATENT NO. : 5,991,999
DATED : November 30, 1999
INVENTOR(S) : Donald E. Weder

It is certified that error appears in the above-identified patent and that said Letters Patent is

Fig. 27

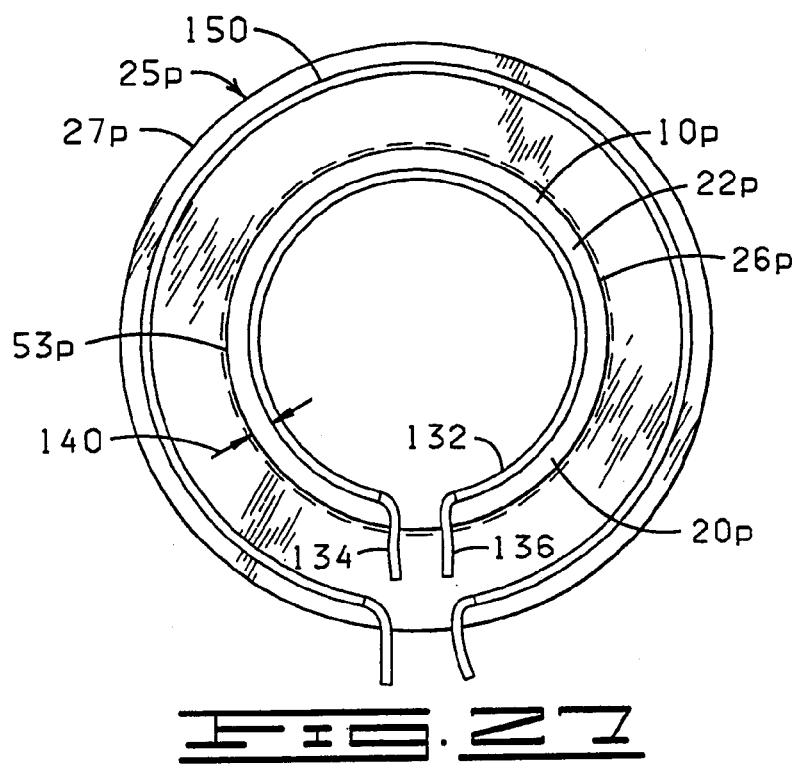

Fig. 28

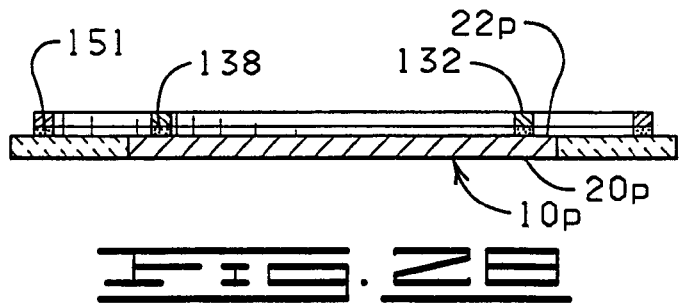

UNITED STATES PATENT AND TRADEMARK OFFICE
CERTIFICATE OF CORRECTION

PATENT NO.      : 5,991,999
DATED           : November 30, 1999
INVENTOR(S)     : Donald E. Weder It is certified that error appears in the above-identified patent and that said Letters Patent is hereby corrected as shown below:

Fig. 29

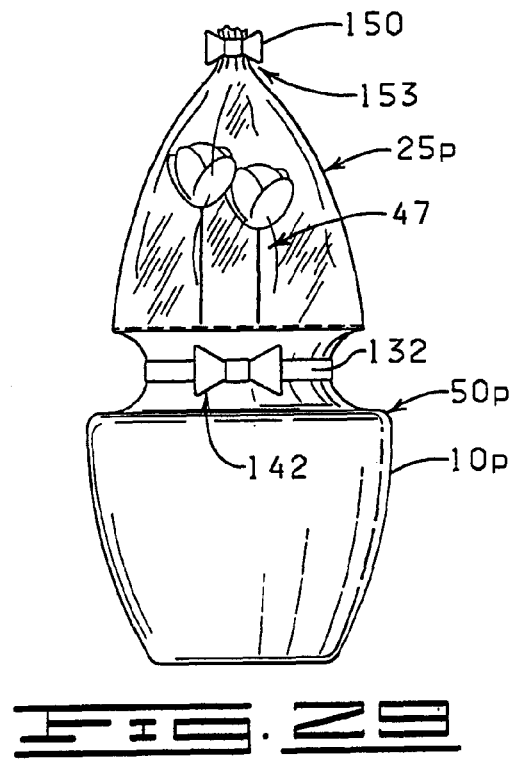

UNITED STATES PATENT AND TRADEMARK OFFICE
CERTIFICATE OF CORRECTION

PATENT NO. : 5,991,999
DATED : November 30, 1999
INVENTOR(S) : Donald E. Weder

Page 23 of 29

It is certified that error appears in the above-identified patent and that said Letters Patent is hereby corrected as shown below:

Fig. 30

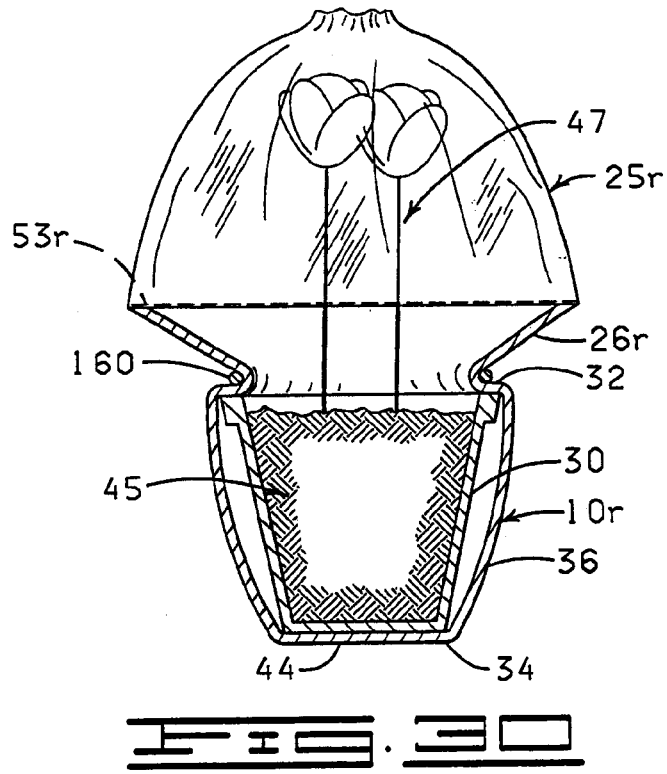

Fig. 31

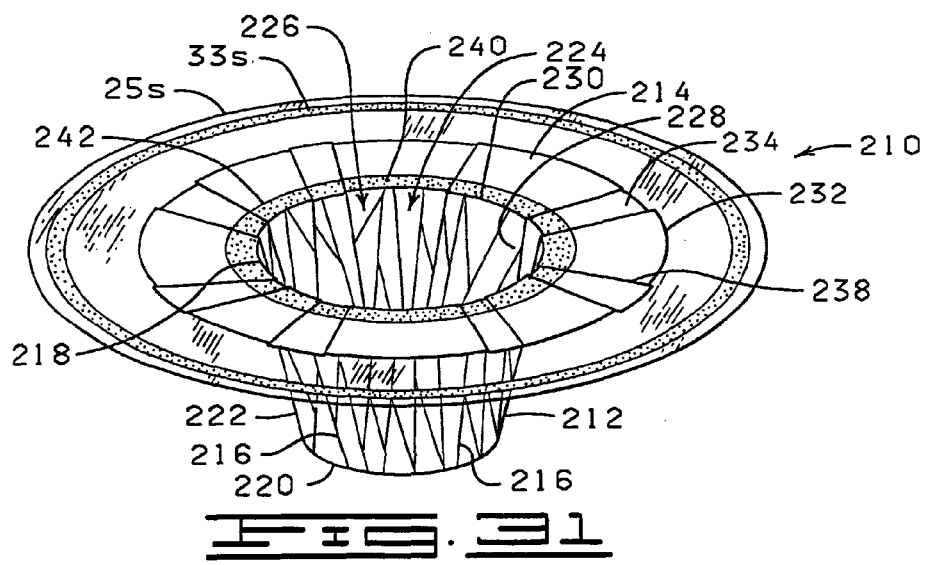

UNITED STATES PATENT AND TRADEMARK OFFICE
CERTIFICATE OF CORRECTION

PATENT NO. : 5,991,999
DATED : November 30, 1999
INVENTOR(S) : Donald E. Weder

It is certified that error appears in the above-identified patent and that said Letters Patent is hereby corrected as shown below:

Fig. 32

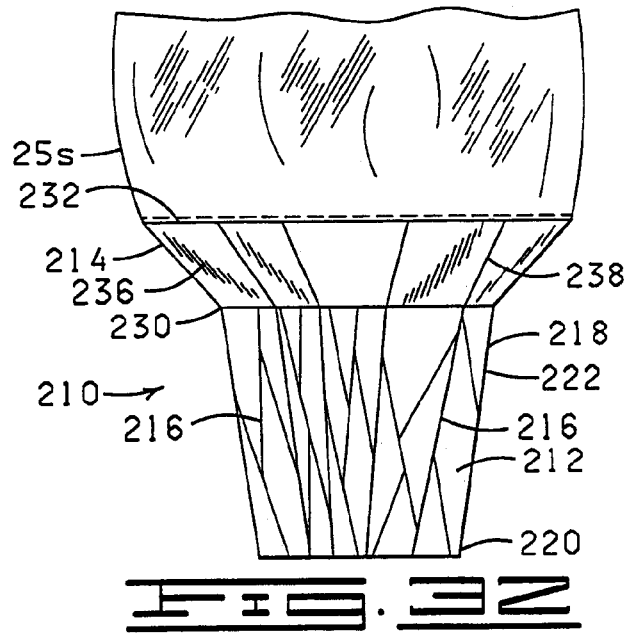

Fig. 33

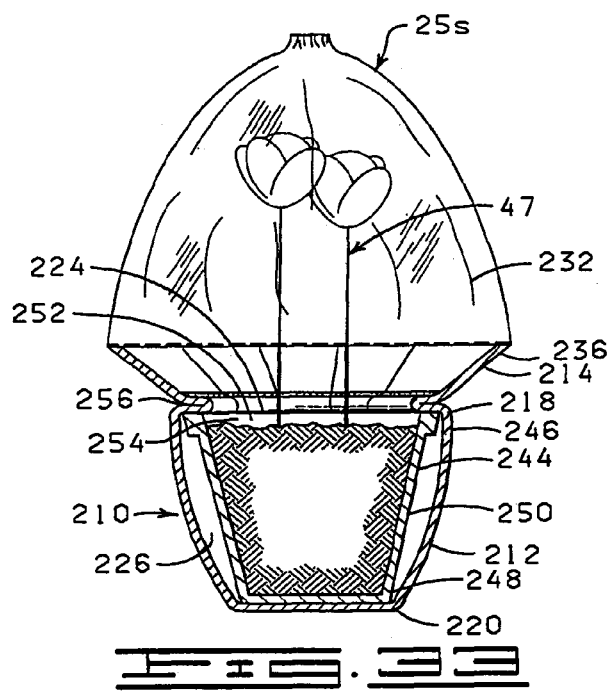

UNITED STATES PATENT AND TRADEMARK OFFICE
CERTIFICATE OF CORRECTION

PATENT NO. : 5,991,999
DATED : November 30, 1999
INVENTOR(S) : Donald E. Weder

It is certified that error appears in the above-identified patent and that said Letters Patent is hereby corrected as shown below:

Fig. 34

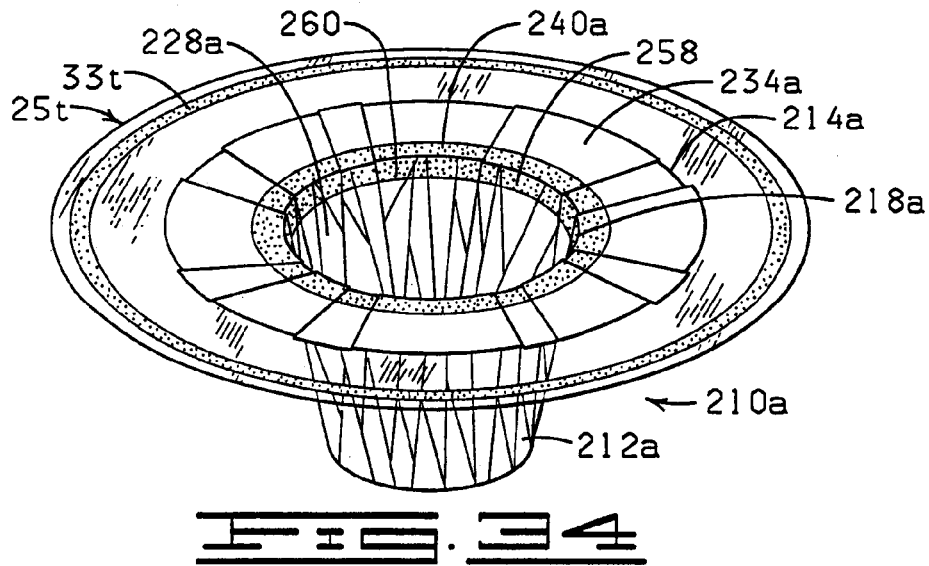

Fig. 35

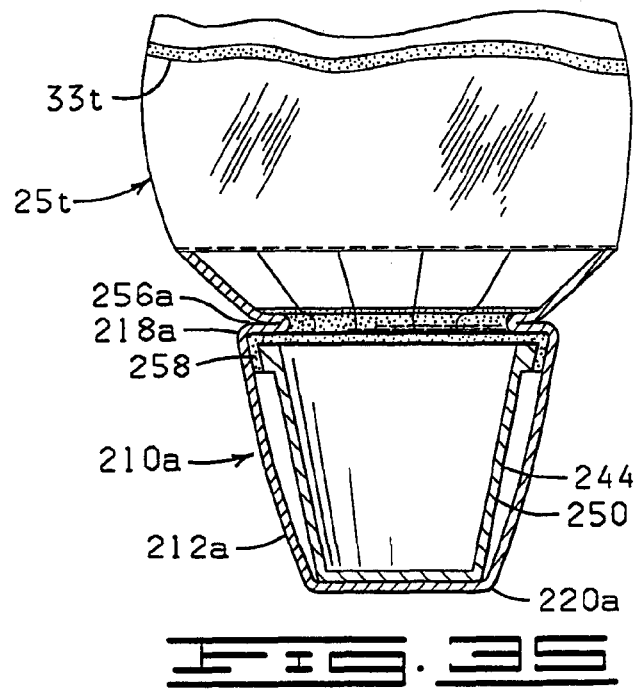

UNITED STATES PATENT AND TRADEMARK OFFICE
CERTIFICATE OF CORRECTION

PATENT NO.     : 5,991,999
DATED          : November 30, 1999
INVENTOR(S)    : Donald E. Weder It is certified that error appears in the above-identified patent and that said Letters Patent is hereby corrected as shown below:

Fig. 36

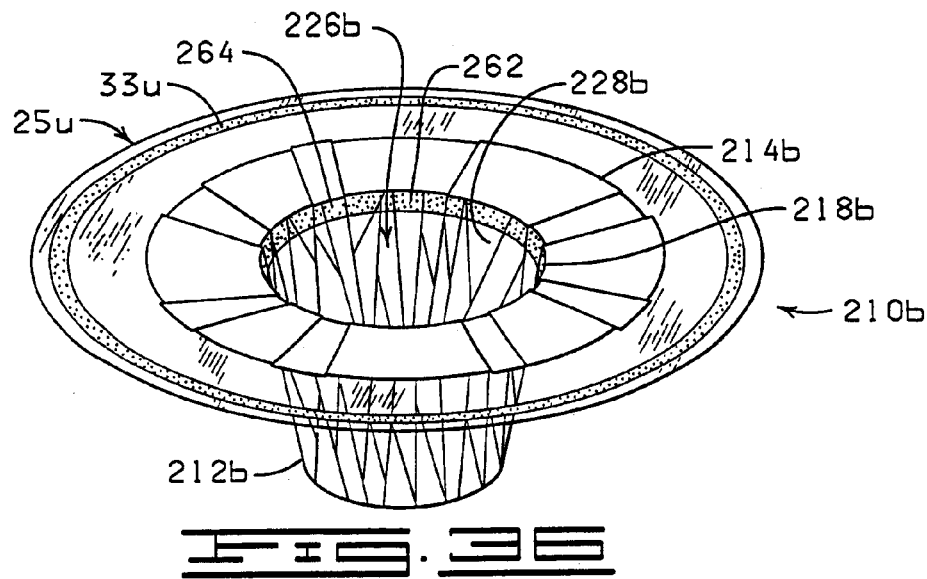

Fig. 37

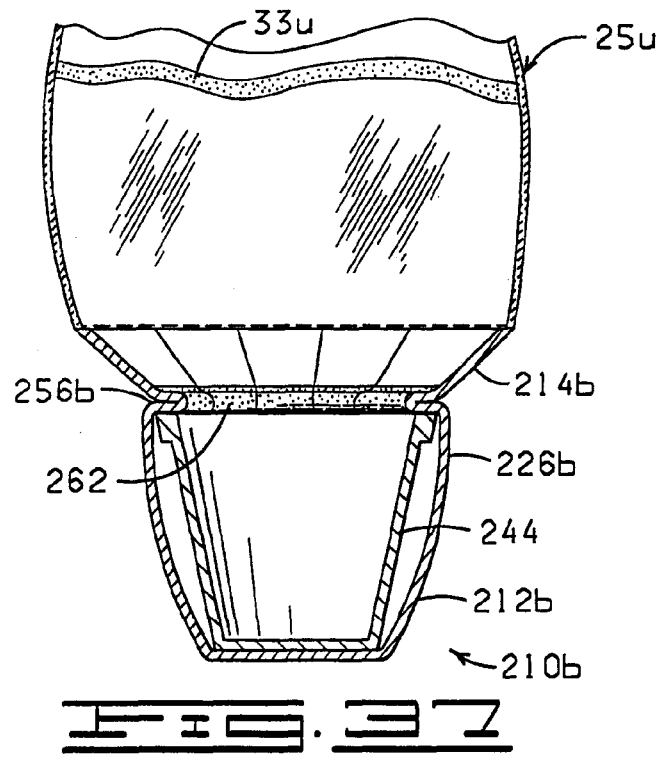

UNITED STATES PATENT AND TRADEMARK OFFICE
CERTIFICATE OF CORRECTION

PATENT NO. : 5,991,999
DATED : November 30, 1999
INVENTOR(S) : Donald E. Weder

It is certified that error appears in the above-identified patent and that said Letters Patent is hereby corrected as shown below:

Fig. 38

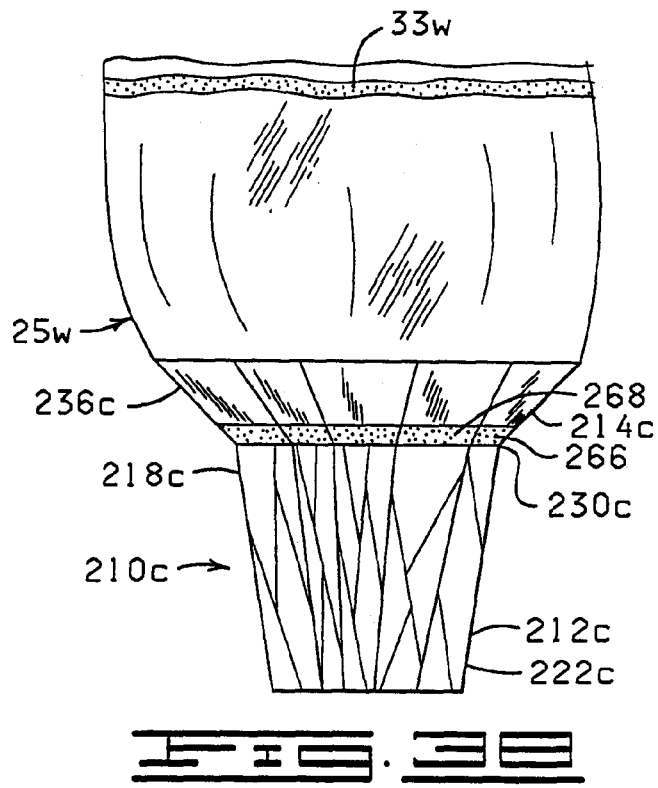

UNITED STATES PATENT AND TRADEMARK OFFICE
CERTIFICATE OF CORRECTION

PATENT NO. : 5,991,999
DATED : November 30, 1999
INVENTOR(S) : Donald E. Weder

It is certified that error appears in the above-identified patent and that said Letters Patent is hereby corrected as shown below:

Fig. 39

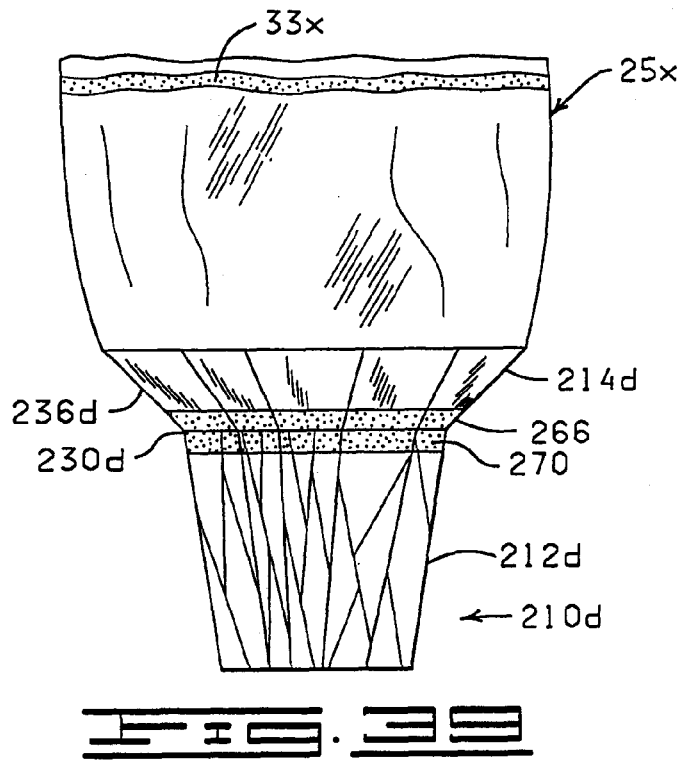

UNITED STATES PATENT AND TRADEMARK OFFICE
CERTIFICATE OF CORRECTION

PATENT NO. : 5,991,999
DATED : November 30, 1999
INVENTOR(S) : Donald E. Weder

It is certified that error appears in the above-identified patent and that said Letters Patent is hereby corrected as shown below:

Fig. 40

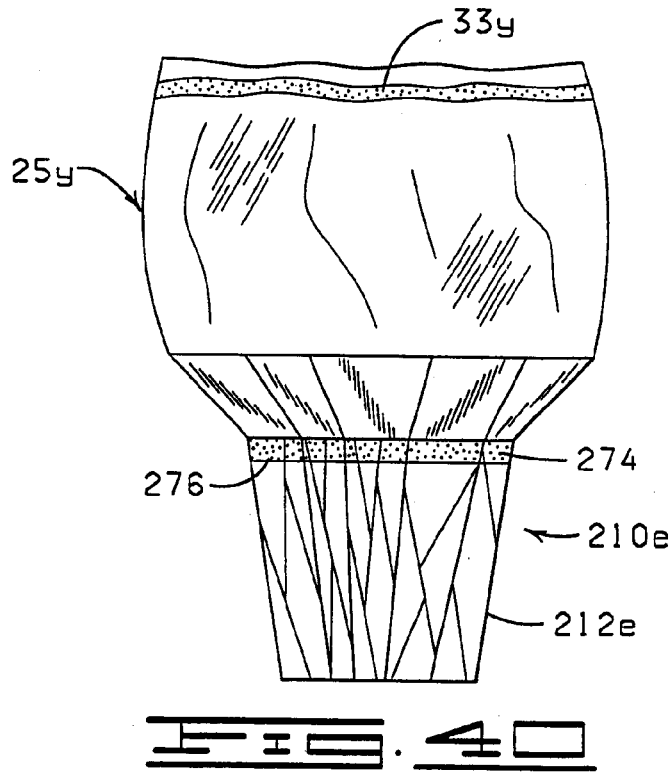

Signed and Sealed this

Seventeenth Day of September, 2002

Attest:

JAMES E. ROGAN
Attesting Officer    Director of the United States Patent and Trademark Office